(12) United States Patent
Yang

(10) Patent No.: US 12,278,773 B2
(45) Date of Patent: Apr. 15, 2025

(54) SYSTEM AND METHOD FOR AGGREGATING COMMUNICATIONS LINKS

(71) Applicant: Huawei Technologies Co., Ltd., Shenzhen (CN)

(72) Inventor: Yunsong Yang, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 470 days.

(21) Appl. No.: 17/622,659

(22) PCT Filed: Jun. 25, 2019

(86) PCT No.: PCT/US2019/039038
§ 371 (c)(1),
(2) Date: Dec. 23, 2021

(87) PCT Pub. No.: WO2020/101752
PCT Pub. Date: May 22, 2020

(65) Prior Publication Data
US 2022/0368481 A1    Nov. 17, 2022

(51) Int. Cl.
*H04L 5/00*  (2006.01)
*H04L 1/08*  (2006.01)
(Continued)

(52) U.S. Cl.
CPC .............. *H04L 5/0044* (2013.01); *H04L 1/08* (2013.01); *H04L 1/1621* (2013.01); *H04L 1/1642* (2013.01); *H04W 84/12* (2013.01)

(58) Field of Classification Search
CPC ....... H04L 5/0044; H04L 1/08; H04L 1/1621; H04L 1/1642; H04L 47/34; H04L 47/41; H04W 84/12; H04W 28/082
(Continued)

(56) References Cited

U.S. PATENT DOCUMENTS 9,866,354 B2    1/2018  Stacey et al.
9,906,627 B2 *  2/2018  Anil .................. H04L 69/04
(Continued)

OTHER PUBLICATIONS

IEEE, "Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," IEEE P802.11ax/D4.1, Apr. 2019, 754 pages.
(Continued)

*Primary Examiner* — Rownak Islam
(74) *Attorney, Agent, or Firm* — Slater Matsil, LLP

(57) ABSTRACT

Embodiments of this disclosure provide an efficient mechanism for re-ordering media access control (MAC) service data units (MSDU) segments by including link-specific MAC addresses and link-independent sequence control fields in MAC headers appended to MAC protocol data unit (MPDU) payloads within which the MSDU segments are encapsulated prior to transmitting the MPDU payloads over multiple aggregated 802.11 links. Each sequence control field may include a link-independent sequence number that indicates a relative position of a corresponding MSDU within the sequence of MSDUs of the same traffic stream. Additionally, when the MSDU segment is an MSDU fragment, the sequence control field may further include a link-independent fragment number that indicates a relative position of the corresponding MSDU fragment within a sequence of MSDU fragments of the MSDU that was subject to fragmentation.

30 Claims, 17 Drawing Sheets

(51) Int. Cl.
*H04L 1/1607* (2023.01)
*H04W 84/12* (2009.01)

(58) Field of Classification Search
USPC .......................................................... 370/329
See application file for complete search history.

(56) References Cited

U.S. PATENT DOCUMENTS

| | | |
|---|---|---|
| 2016/0337783 A1* | 11/2016 | Seok .................. H04L 1/16 |
| 2017/0311204 A1 | 10/2017 | Cariou et al. |
| 2018/0183548 A1* | 6/2018 | Gan ................ H04L 1/1614 |
| 2018/0262951 A1* | 9/2018 | Jiang ............... H04W 28/065 |
| 2019/0036651 A1* | 1/2019 | Chitrakar ............. H04L 1/1832 |
| 2019/0150214 A1 | 5/2019 | Zhou et al. |
| 2022/0247691 A1* | 8/2022 | Xu ..................... H04L 47/34 |

OTHER PUBLICATIONS

IEEE, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 3: Enhancements for Very High Throughput in the 60 GHZ Band," IEEE Std 802.11ad—2012, 628 pages.

\* cited by examiner

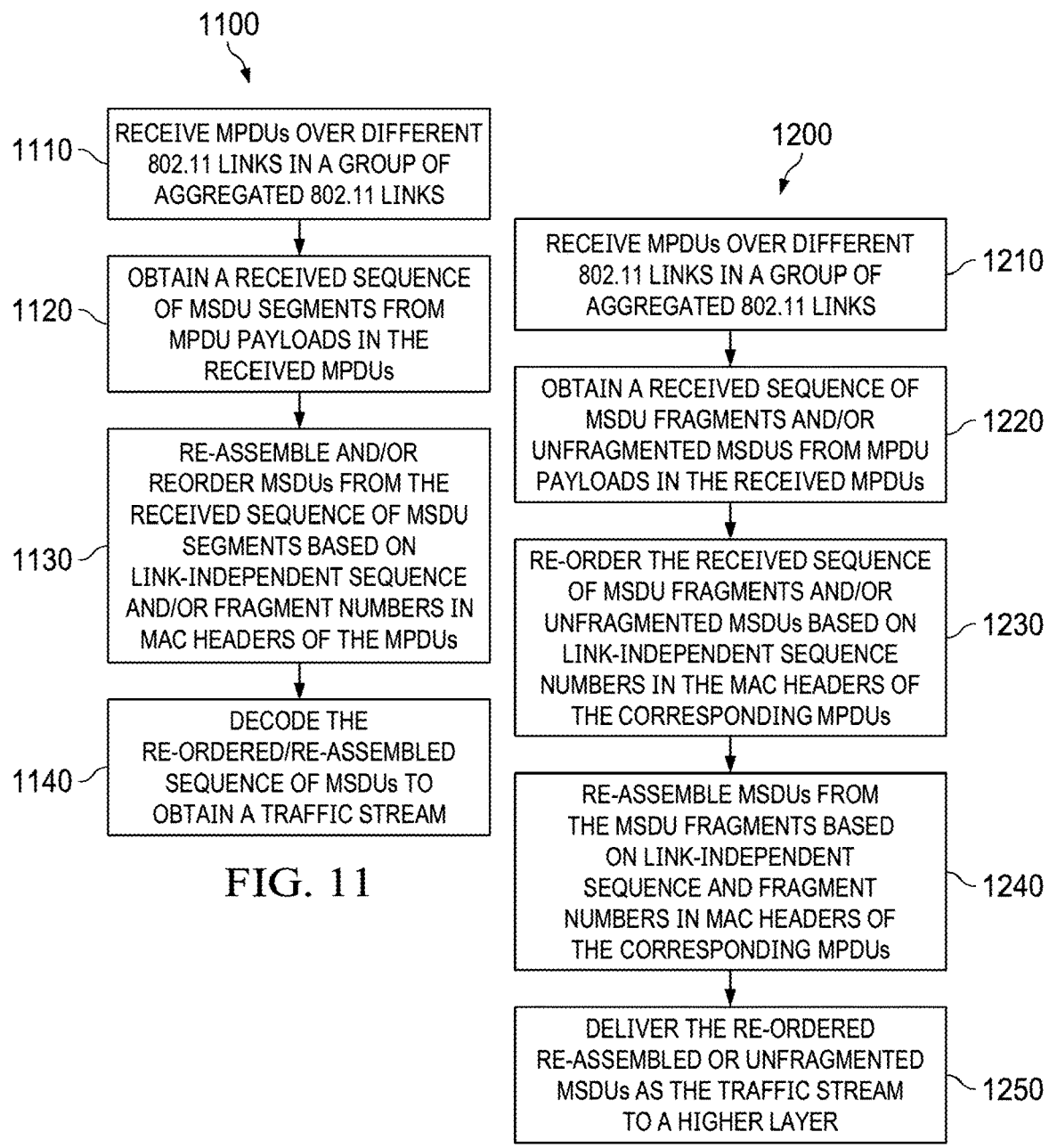
FIG. 11
FIG. 12
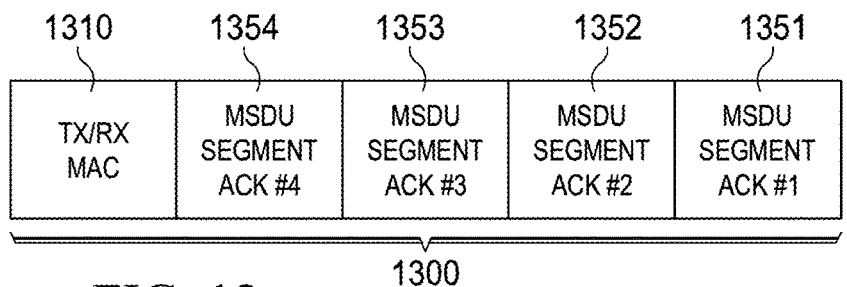
FIG. 13

SYSTEM AND METHOD FOR AGGREGATING COMMUNICATIONS LINKS

CROSS-REFERENCE TO RELATED APPLICATIONS

This application is a national phase filing under section 371 of PCT Application No. PCT/US2019/039038, filed on Jun. 25, 2019 and entitled "System and Method for Aggregating Communications Links," which is hereby incorporated by reference herein as if reproduced in its entirety.

TECHNICAL FIELD

The present disclosure relates generally to a system and method for wireless communications, and, in particular embodiments, to a system and method for aggregating communications links.

BACKGROUND

Modern Wi-Fi devices increasingly support multi-band capability. For example, it is common that Wi-Fi access points (APs) and stations (STAs) support 2.4 and 5 GHz dual-band. Also, some devices are tri-band capable on 2.4, 5, and 60 GHz bands. The Institute of Electrical and Electronic Engineers (IEEE) 802.11 Task Group be, whose predecessor is known as Extremely High Throughput Study Group (EHT SG), has accepted lower latency, lower jitters, and lower packet loss as parts of their work scope, in addition to higher throughputs. The need for higher throughput is driven by demand for video at 4K or higher resolutions and the need for lower latency and jitters is driven by applications such as gaming, industrial control and augmented reality. The demand for these newer services can be addressed by using multiple parallel links across the multiple bands with improved methods for link discovery and configuration, traffic distribution and aggregation across the multiple links.

SUMMARY

Technical advantages are generally achieved by embodiments of this disclosure which describe a system and method for aggregating communication links.

In accordance with an embodiment, a method for communicating a sequence of media access control (MAC) service data units (MSDUs) that make up a traffic stream from a first station (STA) to a second STA over an Institute of Electrical and Electronics Engineers (IEEE) 802.11 network is provided. In this example, the method includes transmitting, by the first STA to the second STA, a first MAC protocol data unit (MPDU) payload over a first 802.11 link and a second MPDU payload over a second 802.11 link that is different than the first 802.11 link. A first MSDU segment in the sequence of MSDUs is encapsulated within the first MPDU payload and a second MSDU segment in the sequence of MSDUs is encapsulated within the second MPDU payload. A first MAC header appended to the first MPDU payload includes transmitter (TX) and receiver (RX) MAC addresses that are specific to the first 802.11 link and a first sequence control field that identifies a location of the first MSDU segment within the sequence of MSDUs, and a second MAC header appended to the second MPDU payload includes TX and RX MAC addresses that are specific to the second 802.11 link and a second sequence control field that identifies the location of the second MSDU segment within the sequence of MSDUs. In one example, the TX and RX MAC addresses in the first MAC header include a first TX MAC address that uniquely identifies the first STA on the first 802.11 link and a first RX MAC address that uniquely identifies the second STA on the first 802.11 link. In that example, the TX and RX MAC addresses in the second MAC header include a second TX MAC address that is different than the first TX MAC address and uniquely identifies the first STA on the second 802.11 link and a second RX MAC address that is different than the first RX MAC address and uniquely identifies the second STA on the second 802.11 link. In the same example, or another example, the first MPDU payload and the second MPDU payload are encrypted in accordance with the same security key and the same pair of TX and RX MAC addresses. In any one of the above-mentioned examples, or in a new example, the first sequence control field and the second sequence control field include different sequence numbers to indicate that the first MSDU segment and the second MSDU segment correspond to different MSDUs within the sequence of MSDUs. In such an example, a relative difference between the respective sequences numbers in the first sequence control field and the second sequence control field may correspond to a relative difference between the locations of the different MSDUs within the sequence of MSDUs. In any one of the above-mentioned examples, or in a new example, the first sequence control field and the second sequence control field include the same sequence number to indicate that the first MSDU segment and the second MSDU segment correspond to a common MSDU within the sequence of MSDUs. In such an example, the first sequence control field and the second sequence control field may further include different fragment numbers to indicate that the first MSDU segment and the second MSDU segment are different fragments of the common MSDU within the sequence of MSDUs. Likewise, a more fragments bit in the first MAC header is set to one to indicate that the common MSDU consists of a sequence of MSDU fragments, where the sequence of MSDU fragments include a first fragment in the first MSDU segment and at least a second fragment in the second MSDU segment. In that same example, a relative difference between the fragment numbers in the first sequence control field and the second sequence control field may correspond to a relative difference between the locations of the different MSDU fragments in the sequence of MSDU fragments of the common MSDU. In the same example, the first sequence control field and the second sequence control field may further include the same fragment number to indicate that the first MSDU segment and the second MSDU segment are the same MSDU fragment. In the same example, a retry field in the second MAC header may indicate that the second MPDU payload is a retransmission of the first MPDU payload such that a common MSDU or MSDU fragment is encapsulated within both the first MPDU payload and the second MPDU payload. In one instance, the second MPDU payload is transmitted in response to an indication of a failure of the transmission of the first MPDU payload. In another instance, the second MPDU payload is transmitted in response to determining that duplicate transmissions are needed for MPDU payloads encapsulating MSDU segments from the sequence of MSDUs. In any one of the above-mentioned examples, or in a new example, the method further includes receiving, by the first station, a block acknowledgement (BA) message from the second station over the first 802.11 link. The BA message may include a first field indicating whether the first MSDU segment was received successfully and a second field indicating whether the second MSDU segment was received successfully. The first field and the second field may be bits in bitmap carried by the BA message. In any one of the above-mentioned examples, or in a new example, the first 802.11 link and the second 802.11 link are established over different frequency channels. An apparatus for performing the above-described method is also provided.

In accordance with an embodiment, another method for communicating a sequence of media access control (MAC) service data units (MSDUs) that make up a traffic stream from a first station (STA) to a second STA over an Institute of Electrical and Electronics Engineers (IEEE) 802.11 network is provided. In this example, the method includes receiving, by the second STA from the first STA, a first MAC protocol data unit (MPDU) payload over a first 802.11 link and a second MPDU payload over a second 802.11 link that is different than the first 802.11 link, a first MSDU segment in a sequence of MSDUs being encapsulated within the first MPDU payload and a second MSDU segment in the sequence of MSDUs being encapsulated within the second MPDU payload. A first MAC header appended to the first MPDU payload includes transmitter (TX) and receiver (RX) MAC addresses that are specific to the first 802.11 link and a first sequence control field that identifies a location of the first MSDU segment within the sequence of MSDUs, and a second MAC header appended to the second MPDU payload includes TX and RX MAC addresses that are specific to the second 802.11 link and a second sequence control field that identifies the location of the second MSDU segment within the sequence of MSDUs. In one example, the TX and RX MAC addresses in the first MAC header include a first TX MAC address that uniquely identifies the first STA on the first 802.11 link and a first RX MAC address that uniquely identifies the second STA on the first 802.11 link, and the TX and RX MAC addresses in the second MAC header include a second TX MAC address that is different than the first TX MAC address and uniquely identifies the first STA on the second 802.11 link and a second RX MAC address that is different than the first RX MAC address and uniquely identifies the second STA on the second 802.11 link. In such an example, the method may further include decrypting, by the second STA, the first MPDU payload and the second MPDU payload in accordance with the same security key and a common pair of TX and RX MAC addresses. Additionally, the method may further include replacing, by the second STA, the second TX MAC address and the second RX MAC address in the second MAC header with the common pair of TX and RX MAC addresses prior to decrypting the second MPDU payload in accordance with the same security key and the common pair of TX and RX MAC addresses. In any one of the above-mentioned examples, or in a new example, the first sequence control field and the second sequence control field include different sequence numbers to indicate that the first MSDU segment and the second MSDU segment correspond to different MSDUs within the sequence of MSDUs. In such an example, a relative difference between the respective sequences numbers in the first sequence control field and the second sequence control field corresponds to a relative difference between the locations of the different MSDUs within the sequence of MSDUs. In such an example, the method may further include obtaining, by the second STA, a received sequence of MSDUs from at least the first MPDU payload and the second MPDU payload, and re-ordering the received sequence of MSDUs in accordance with at least the different sequence numbers to obtain a re-ordered sequence of MSDUs. In any one of the above-mentioned examples, or in a new example, the first sequence control field and the second sequence control field may include the same sequence number to indicate that the first MSDU segment and the second MSDU segment correspond to a common MSDU within the sequence of MSDUs. The first sequence control field and the second sequence control field further may include different fragment numbers to indicate that the first MSDU segment and the second MSDU segment are different fragments of the common MSDU within the sequence of MSDUs. Additionally, a more fragments bit in the first MAC header may be set to one to indicate that the common MSDU consists of a sequence of MSDU fragments, and the sequence of MSDU fragments may include a first fragment in the first MSDU segment and at least a second fragment in the second MSDU segment. A relative difference between the fragment numbers in the first sequence control field and the second sequence control field may correspond to a relative difference between the locations of the different MSDU fragments in the sequence of MSDU fragments of the common MSDU. The method may further include obtaining, by the second STA, a received sequence of MSDU fragments from at least the first MPDU payload and the second MPDU payload, and assembling the common MSDU from the received sequence of MSDU fragments in accordance with the fragment numbers included in the first sequence control field and the second sequence control field. In any one of the above-mentioned examples, or in a new example, the first sequence control field and the second sequence control field further include the same fragment numbers to indicate that the first MSDU segment and the second MSDU segment are the same MSDU fragment. In one specific example, a retry field in the second MAC header is set to one to indicate that the second MPDU payload is a retransmission of the first MPDU payload such that a common MSDU or MSDU fragment is encapsulated within both the first MPDU payload and the second MPDU payload. Additionally, the method may further include successfully obtaining, by the second STA, the common MSDU or MSDU fragment from the first MPDU payload, and dropping the second MPDU payload without obtaining the common MSDU or MSDU fragment from the second MPDU payload upon determining that the retry field in the second MAC header is set to one. In any one of the above-mentioned examples, or in a new example, the method may further include transmitting, by the second station, a block acknowledgement (BA) message to the first station over the first 802.11 link, the BA message including a first field indicating whether the first MSDU segment was received successfully and a second field indicating whether the second MSDU segment was received successfully. The first field and the second field may be bits in bitmap carried by the BA message. In any one of the above-mentioned examples, or in a new example, the first 802.11 link and the second 802.11 link are established over different frequency channels. An apparatus for performing the above-described method is also provided.

BRIEF DESCRIPTION OF THE DRAWINGS

For a more complete understanding of the present invention, and the advantages thereof, reference is now made to the following descriptions taken in conjunction with the accompanying drawings, in which:

FIG. 11 is a flowchart for receiving MSDU segments over aggregated 802.11 links;

FIG. 12 is a flowchart of another embodiment method for transmitting MSDU segments over aggregated 802.11 links;

FIG. 13 is a diagram of an embodiment block acknowledgement (BA) message described herein;

DETAILED DESCRIPTION OF ILLUSTRATIVE EMBODIMENTS

Figure 1:
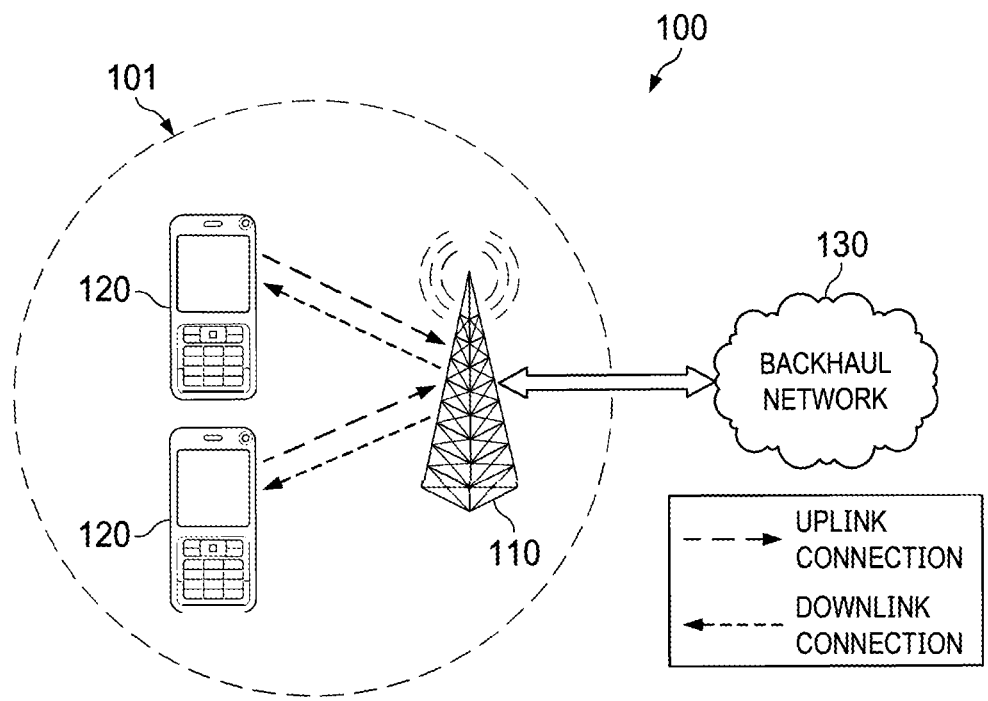
FIG. 1 illustrates an 802.11 network.

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Next generation Institute of Electrical and Electronics Engineers (IEEE) 802.11 standards will aggregate multiple 802.11 links to support the communications of a single traffic stream between two stations (STAs) in order to achieve higher throughput, lower latency/jitters, and reduced packet loss rates. The 802.11 links may be established over different frequency channels, which may or may not be within the same frequency band. A single traffic stream may be encoded into a sequence of media access control (MAC) service data units (MSDUs), which may then be encapsulated into MAC protocol data unit (MPDU) payloads and transmitted over the aggregated 802.11 links. MSDUs with a size less than a fragmentation threshold (e.g., 1500 octets, etc.) may remain unfragmented prior to being encapsulated into the MPDU payloads. MSDUs that have not been subject to fragmentation are referred to herein as "unfragmented MSDUs". It should be appreciated that the fragmentation threshold may be set based on system parameters (e.g., the size of the maximal MPDU payload, whether the MPDU payloads are encrypted or not (as to whether the sizes of the effective MPDU payloads are reduced to make room for an encryption protocol header or not), etc.), and that different systems may have different fragmentation thresholds. MSDUs with a size greater than or equal to the fragmentation threshold may be fragmented prior to being encapsulated into the MPDU payloads. When fragmentation occurs, a single MSDU may be split into a sequence of MSDU fragments, which may be encapsulated into different MPDU payloads and transmitted over different 802.11 links. Throughout this disclosure, unfragmented MSDUs and MSDU fragments of fragmented MSDUs are referred to collectively as "MSDU segments" such that an MSDU segment may correspond to, or otherwise consist of, an entire MSDU or an MSDU fragment depending on whether fragmentation is being performed at by transmitting STA.

Communicating a sequence of MSDU segments over different 802.11 links may result in the MSDU segments received by the receiving STA having a different order than the MSDU segments in the original sequence generated by the transmitting STA. This may be due to a variety of reasons, such as different buffering periods and/or different data transmission rates associated with the respective 802.11 links and re-transmissions of MSDU segments following a failed initial transmission. Accordingly, the receiving STA may need to have some mechanism for verifying the order of, and if necessary reordering, the received MSDU segments before the sequence is decoded.

Conventional Wi-Fi link aggregation techniques use bonding driver software to enable MSDUs of different traffic streams to be communicated over different 802.11 links simultaneously, while MSDUs of the same traffic stream are communicated over the same 802.11 link. This inflexibility is due to that the MAC sub-layer processing of MSDUs at each of the different 802.11 links being independent from one another. For example, the same device may generally use different MAC addresses over different 802.11 links as the identifier for identifying the device either as the transmitting device or the receiving device of the current transmission, depending on which address field, between a transmitter address field and a receiver address field, in the MAC header contains its MAC address. Likewise, different security keys may be used for encryption, decryption, and/or integrity protection on different 802.11 links, and the MSDU sequence number (SN) and fragment number (FN) assignments may be link specific (e.g., SNs and FNs for MSDUs communicated over different 802.11 links may be independent from one another). If MSDU segments of the same traffic stream are communicated over different 802.11 links, they may be received in a different order (i.e., the received sequence of MSDU segments may have a different order than the original sequence of MSDU segments on the transmitter side of the 802.11 links). In some instances, this re-ordering may be due to the 802.11 links supporting different transmission capabilities, or having different congestion or interference conditions, etc. Link-specific sequence/fragment numbers, which indicate the relative order of the MSDU segments communicated over a specific 802.11 link, exhibit no inter-dependence for purposes of allowing the receiver to determine the appropriate ordering of the MSDU segments received over the different 802.11 links.

Embodiments of this disclosure provide an effective means to aggregate available bandwidth of different 802.11 links for transmitting a sequence of MSDUs belonging to a same traffic stream simultaneously, in order to achieve higher throughputs, lower latency and jitters, and reduced packet loss rate. In some embodiments, different unfragmented MSDUs of the same traffic stream, or different fragments of the same fragmented MSDU, may be transmitted over different 802.11 links, thus increasing throughput and reducing transmission latency. In some embodiments, an MSDU segment may be duplicated and transmitted over multiple 802.11 links, thus reducing packet loss with redundancy. The duplicates may be detected and removed by the receiving STA prior to delivery to the higher layer. In some embodiments, when an initial transmission of an MSDU segment fails over one 802.11 link, the MSDU segment is retransmitted over another 802.11 link (e.g., on a first come first serve basis, etc.), thus reducing re-transmission queuing delay and mitigating the head of line blocking issue.

Further, embodiments of this disclosure provide an efficient mechanism for re-ordering the MSDU segments by including link-specific MAC addresses and link-independent sequence control fields in MAC headers appended to MPDU payloads within which the MSDU segments are encapsulated prior to transmitting the MPDU payloads over multiple aggregated 802.11 links. Each MAC header may further include a "more fragments" bit, which indicates whether the MSDU segment is a fragment of a fragmented MSDU that is followed by subsequent MSDU fragments of the same MSDU. More specifically, the more-fragments bit may be set to one to indicate that an MSDU segment is an MSDU fragment that is followed by subsequent MSDU fragments of the same MSDU, or to zero to indicate that an MSDU segment is either an unfragmented MSDU (e.g., when the MB=0 and the FN=0) or the last MSDU fragment in a fragmented MSDU (e.g., when the MB=0 and the FN is greater than or equal to one). Each link-independent sequence control field identifies a location of the corresponding MSDU segment within the sequence of MSDUs. More specifically, the sequence control field of an MSDU segment may include a link-independent sequence number that indicates a relative position of a corresponding MSDU within the sequence of MSDUs of the traffic stream. The sequence number of an MSDU remains constant in all fragments generated from the MSDU and in all retransmissions of the MSDU or fragment thereof. Additionally, when the MSDU segment is an MSDU fragment, the sequence control field may further include a link-independent fragment number that indicates a relative position of the corresponding MSDU fragment within a sequence of MSDU fragments of the MSDU that was subject to fragmentation. The fragment number of a fragment remains constant in all retransmissions of the fragment. In some examples, the fragment number is set to 0 in the first or only fragment of an MSDU and is incremented by one for each successive fragment of that MSDU. An unfragmented MSDU is transmitted with the fragment number set to zero (FN=0) and the more fragments bit set to zero (MB=0). Intermediate fragments within a sequence of MSDU fragments are transmitted with the fragment number set to an integer greater than or equal to one (FN>=1) and the more fragments bit set to one (MB=1). The last fragment within a sequence of MSDU fragments is transmitted with the fragment number set to an integer greater than or equal to one (FN=1, 2, etc.) and the more fragments bit set to one (MB=0). Thus, the more fragments bit can be used together with the fragment number to determine whether an MSDU is an unfragmented MSDU (MB=0, FN=0), a first or intermediate MSDU fragment in a sequence of MSDU fragments corresponding to a common MSDU (MB=1, FN>=0), or the last MSDU fragment in a sequence of MSDU fragments corresponding to a common MSDU (MB=0, FN>=1). The locations indicated by the sequence number and/or the fragment number in the sequence control field have no relationship to, and are not affected by, the 802.11 link over which the MSDU segment is communicated. In some examples, the sequence number and/or fragment number are associated with the MSDU segment before the MSDU segment is assigned to a specific 802.11 link.

Because the sequence numbers are independent of the 802.11 links, when MSDUs of a given sequence are communicated over different 802.11 links, the respective sequence numbers have an inter-relationship with one another such that a difference between the sequence numbers corresponds to a relative difference between the locations of the MSDUs within the sequence. This allows the receiving STA to determine the appropriate order of the MSDUs by comparing the sequence numbers. Likewise, when two MSDU fragments in a common MSDU are communicated over different 802.11 links, the inter-relationship between the corresponding link-independent fragment numbers means that the difference in their values corresponds to a relative difference between the locations of the MSDU fragments within the sequence of MSDU fragments of the common MSDU, which in turn allows the receiving STA to determine the appropriate order of the MSDU fragments by comparing the fragment numbers. These and other aspects are described in greater detail below.

FIG. 1 is a diagram of an 802.11 network 100 for communicating data. The network 100 comprises an access point (AP) station (STA) 110 having a coverage area 101, a plurality of non-AP STAs 120, and a backhaul network 130. The AP STA no may include any components or collection of components capable of providing wireless access by, inter alia, establishing connections for both uplink and downlink communications with the non-AP STAs 120. The non-AP STAs 120 may comprise any components or collection of components capable of establishing a wireless connection with the AP STA no. The backhaul network 130 may be any component or collection of components that allow data to be exchanged between the AP STA no and a remote end (not shown). In some embodiments, the network 100 may comprise various other wireless devices, such as relays, femtocells, etc. The AP STA no and the non-AP STAs 120 may collectively be referred to as "stations (STAs)" such that a STA may be an AP STA or a non-AP STA.

Figure 2A:
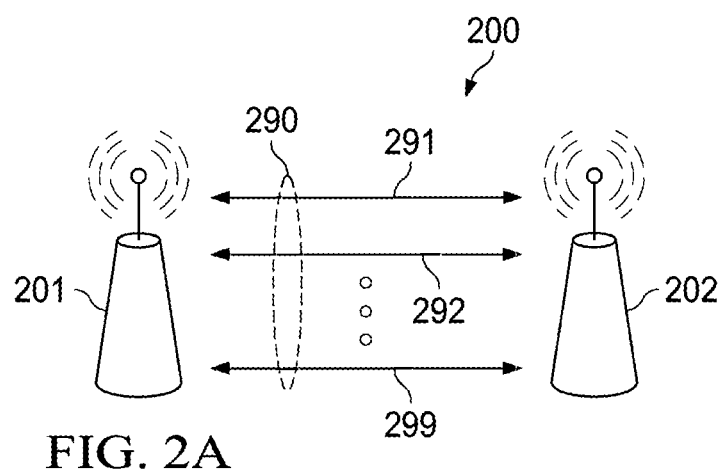
FIGS. 2A-2B illustrate another 802.11 network.
Figure 2B:
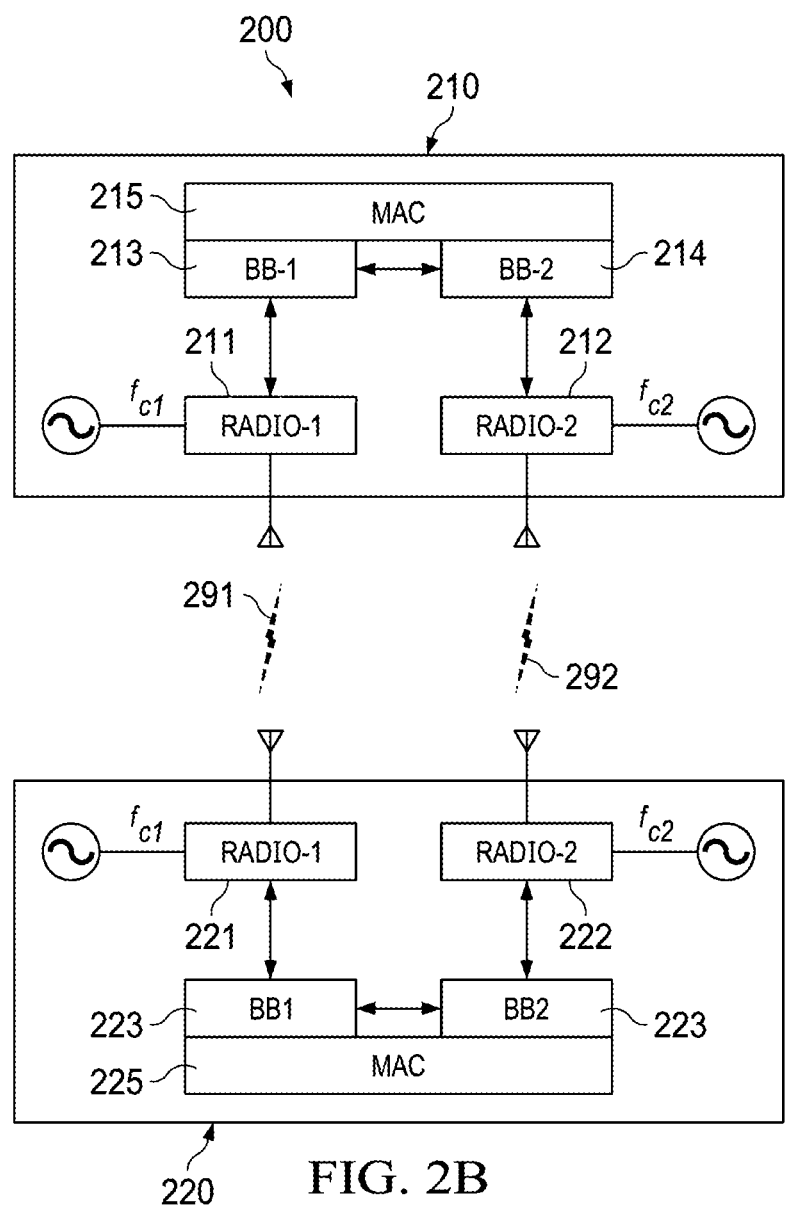

FIGS. 2A and 2B are diagrams of an 802.11 network 200 in which a STA 210 communicates with a STA 220 over an aggregated set of 802.11 links 290 that include 802.11 links 291, 292, 299. As referred to herein, an 802.11 link is "different" than another 802.11 link when the 802.11 links are established over different frequency channels. The STA 210 (referred to as the "transmitting STA 210") may communicate a sequence of MSDUs over the aggregated set of 802.11 links 290 to the STA 220 (referred to as the "receiving STA 220") by encapsulating MSDUs segments corresponding to the MSDUs within MPDU payloads, appending MAC headers to the MPDU payloads to form MPDUs (also known as frames), and then transmitting the MPDUs over the 802.11 links 291, 292, 299. In some embodiments, the MPDU payloads may be encrypted using the same security key and the same pair of TX and RX MAC addresses of STA 210 and STA 220 prior to appending the MAC header to the MPDU payloads. In some embodiments, MPDUs may be transmitted over different 802.11 links, without duplicating with one another. In some embodiments, a same MPDU may be duplicated and transmitted over multiple of the different 802.11 links to improve reliability with redundant transmissions. In some embodiments, the MPDU payload in an MPDU that has failed in an initial transmission over an 802.11 link may be re-transmitted with a different MAC header over a different 802.11 link, e.g., on a first-come-first-serve basis, so as to reduce re-transmission latency and to mitigate head-of-line blocking issue.

FIG. 2B is a diagram of the internal components of the STAs 210, 220 from FIG. 2. As shown, the transmitting STA 210 includes radio transceivers 211, 212, base-band processors 213, 214, and a MAC processor 215. Likewise, the receiving STA 220 includes radio transceivers 221, 222, base-band processors 223, 224, and a MAC processor 225. The radio transceivers 211, 212, 212, 222 may include any collection of components for transmitting and/or receiving wireless signals over the 802.11 links 291, 292, including components on a TX path for up-converting a base band signal into an RF signal and components on an RX path for down-converting an RF signal into a base band signal. The base-band signal may include the MPDUs and appended physical (PHY) layer headers. The base-band processors 213, 214, 223, 224 may include any collection of components for processing MPDUs into the baseband signal on the TX path and the baseband signal into MPDUs on the RX path.

Figure 3A:
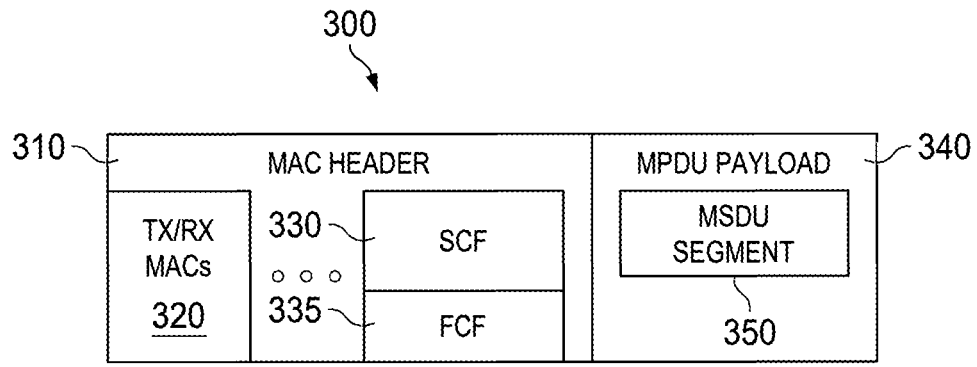
FIGS. 3A-3C illustrate MPDU frame structures.
Figure 3B:
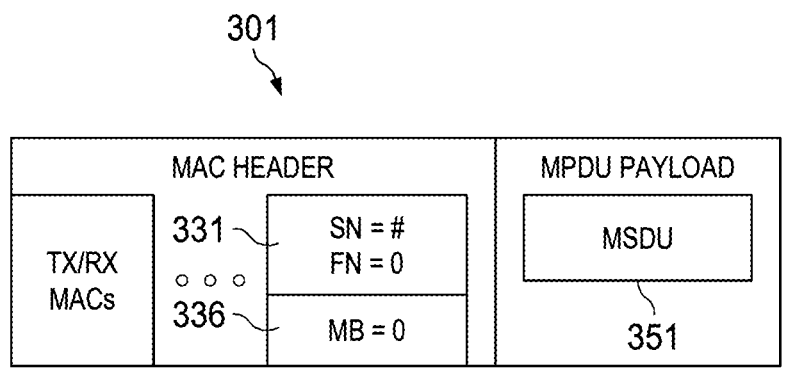
Figure 3C:
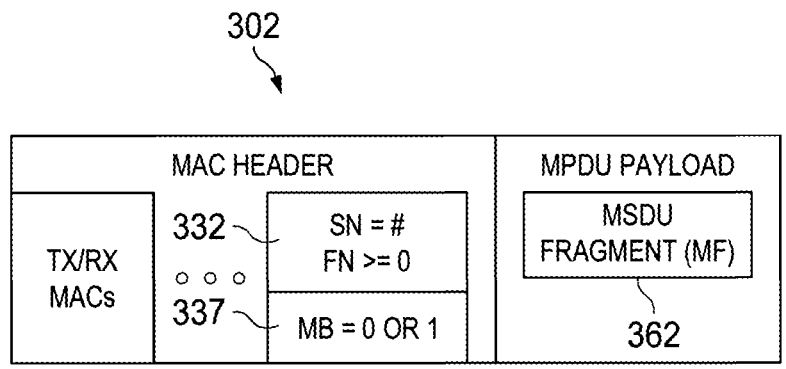

FIGS. 3A-3C illustrate MPDU structures 300-302 for enabling 802.11 link aggregation. The MPDU structure 300 includes a MAC header 310 appended to an MPDU payload 340. The MAC header 310 includes a MAC address field 320, a sequence control field 330, and a frame control field 335, while the MPDU payload 340 includes an MSDU segment 350. The MAC address field 320 may specify a TX MAC address and an RX MAC address associated with an 802.11 link over which the MPDU payload 340 is communicated. The TX MAC address may uniquely identify the transmitting STA on the 802.11 link, and the RX MAC address may uniquely identify a specific receiving STA (or a group of receiving STAs on the 802.11 link when the RX MAC address is a group address). In an embodiment, both the TX and RX MAC addresses may be link-specific such that they are exclusively used over a single 802.11 link during a given period. In some embodiments, the TX and RX MAC addresses that are included in the MAC header may be used for encryption and integrity protection by the receiving and transmitting STAs. In other embodiments, the TX and RX MAC addresses that are included in the MAC header may be converted (e.g., replaced) with a different set of TX and RX MAC addresses that are link-independent, which may be used by the transmitting STA for encryption and integrity protection, and by the receiving STA for decryption and integrity verification. In such embodiments, the transmitting STA may maintain a table that maps the link-independent TX and RX MAC addresses used for encryption and integrity protection to the link-specific TX and RX addresses that are ultimately included in the MAC header for transmission, and the receiving STA may maintain a table that maps the link-specific TX and RX MAC addresses (from the received MAC header) to the link-independent TX and RX addresses that are ultimately used for decryption and integrity verification. The sequence control field 330 includes information (e.g., a sequence number, a fragment number, etc.) that indicates a location of the MSDU segment 350 within a sequence of MSDUs corresponding to a traffic stream. The frame control field 335 includes a more fragments bit indicating whether there are more fragments of the same MSDU to follow the corresponding MSDU segment. In some embodiments, the frame control field 335 may include a retry bit indicating whether the MPDU payload 340 is a retransmission of an previously transmitted MPDU payload such that the MPDU payload 340 and the previously transmitted MPDU payload carry a common MSDU or MSDU fragment (e.g., a common MSDU or MSDU fragment is encapsulated within both the MPDU payload 340 and the previously transmitted MPDU payload).

The MSDU segment 350 may be either an unfragmented MSDU or an MSDU fragment. The MPDU structure 301 is a specific example of the MPDU structure 300 that carries an unfragmented MSDU 351, rather than an MSDU fragment. As shown, the sequence control field 331 includes a non-zero sequence number and a fragment number that is set to zero. The non-zero sequence number in the sequence control field 331 identifies a location of the MSDU 351 within the sequence of MSDUs. The fragment number in the sequence control field 331 and the more fragments bit in the frame control field 336 are both set to zero (MB=0, FN=0) to indicate that the MSDU 351 is a whole MSDU, rather than an MSDU fragment.

The MPDU structure 302 is a specific example of the MPDU structure 300 that carries an MSDU fragment 362, rather than an entire unfragmented MSDU. As shown, the sequence control field 332 includes a non-zero sequence number and a fragment number. The fragment number for the first fragment of a common MSDU may be set to 0 and may be incremented by one for each successive fragment of the common MSDU. The non-zero sequence number in the sequence control field 332 identifies a location of the whole MSDU from the MSDU fragment was obtained, and the fragment number in the sequence control field 332 identifies a relative position of the MSDU fragment 362 within the whole MSDU. The more fragments bit in the frame control field 337 may be set to one to indicate that the MSDU fragment 362 is followed by subsequent MSDU fragments from the corresponding MSDU or zero to indicate that the MSDU fragment 362 is the last MSDU fragments in the sequence of MSDU fragments from the corresponding MSDU.

Figure 4:
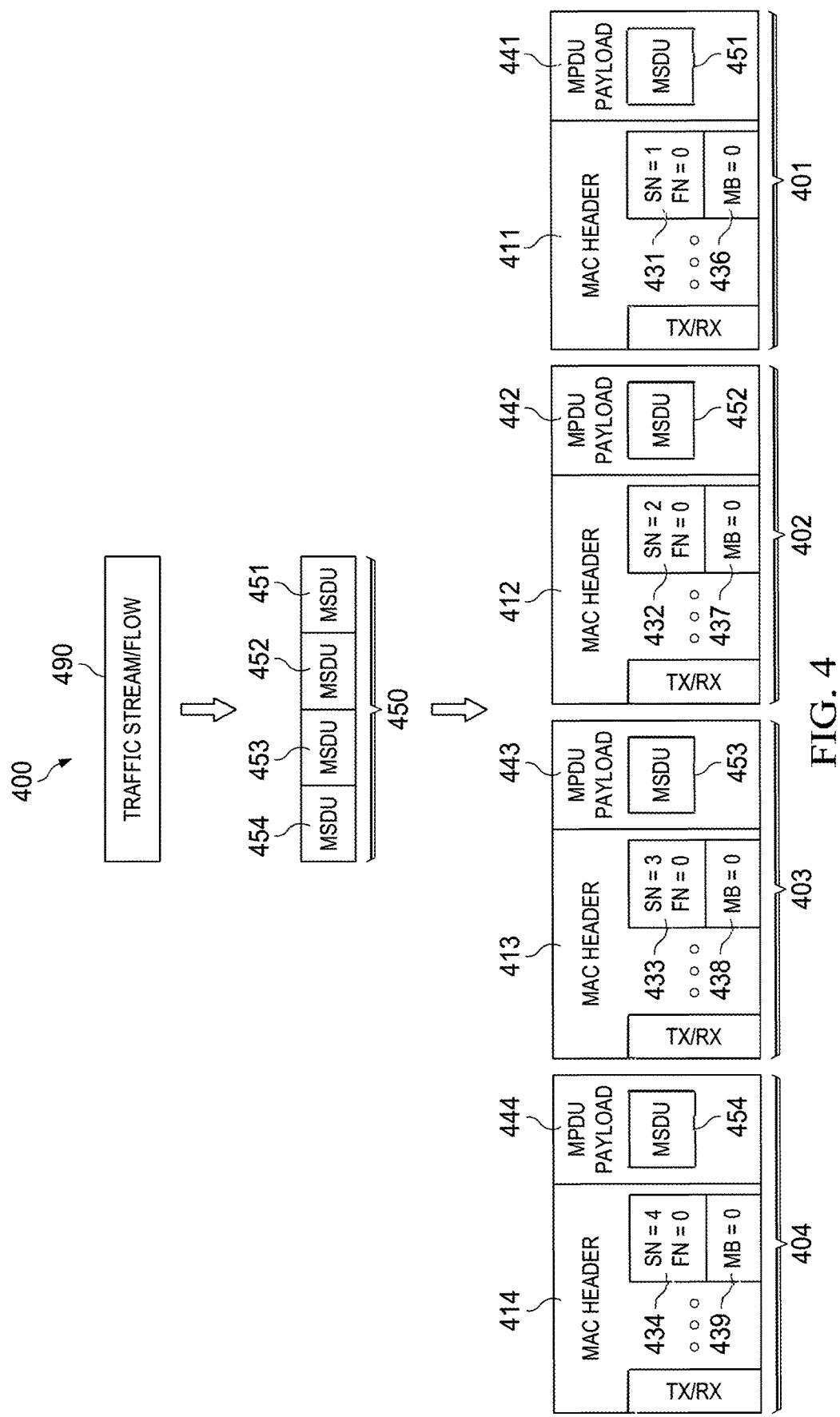
FIG. 4 illustrates a processing flow for encoding a data stream into MSDUs and encapsulating the MSDUs into MPDU payloads of MPDUs.

FIG. 4 illustrates a processing flow 400 for encoding a traffic stream 490 into MPDUs 401-404. As shown, the traffic stream 490 is first received from a protocol layer that is higher than the MAC layer, such as the Logic Link Control (LLC) layer, as a sequence of MSDUs 450 that includes MSDUs 451, 452, 453, 454, each with a size less than the fragmentation threshold. The MSDUs 451, 452, 453, 454 are then encapsulated into MPDU payloads 441, 442, 443, 444 (respectively), and then MAC headers 411, 412, 413, 414 are appended to the MPDU payloads 441, 442, 443, 444 (respectively) to form the MPDUs 401, 402, 403, 404. The MAC headers 411, 412, 413, 414 include sequence control fields 431, 432, 433, 434 (respectively) and frame control fields 436, 437, 438, 439 (respectively). The sequence control fields 431, 432, 433, 434 indicate sequence numbers (SNs) identifying the relative positions of the corresponding MSDU 451, 452, 453, 454 within the sequence of MSDUs 450 and fragment numbers (FNs), which are set to zero. The frame control fields 436, 437, 438, 439 include more fragments bits (depicted as "MB"), which are set to zero to indicate that the MSDUs 451, 452, 453, 454 are not followed by related MSDU fragments (which is the case, since the MSDUs 451, 452, 453, 454 are unfragmented MSDUs). Although the sequence numbers are depicted as incrementing from one, it should be appreciated that they may start from any number (e.g., N, N+1, etc.). It should be appreciated that any number of MSDUs (e.g., two or more MSDUs) may be included in a sequence of MSDUs formed from a traffic flow.

Figure 5:
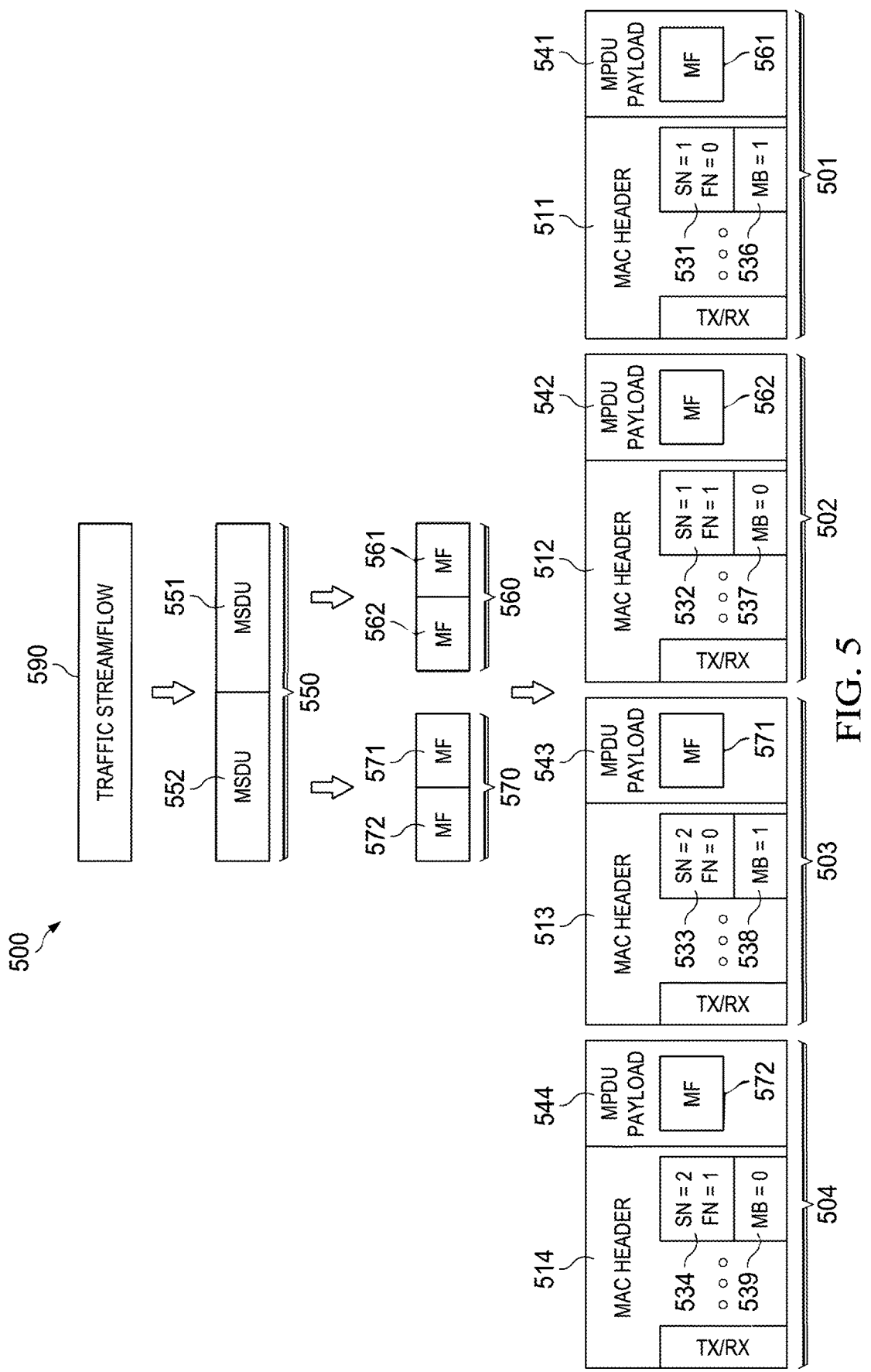
FIG. 5 illustrates a processing flow for encoding a data stream into MSDU segments and encapsulating the MSDU segments into MPDU payloads of MPDUs.

FIG. 5 illustrates a processing flow 500 for encoding and a traffic stream 590 into MSDUs 501-504. As shown, the traffic stream 590 is first received from a higher layer, e.g., a protocol layer above the MAC layer (e.g., the Logical Link Control (LLC) layer, etc.), as a sequence of MSDUs 550 that includes MSDU 551 and MSDU 552, each with a size greater than or equal to the fragmentation threshold. The MSDU 551 is fragmented into a sequence of MSDU fragments 560 that includes MSDU fragment 561 and MSDU fragment 562, while the MSDU 552 is fragmented into a sequence of MSDU fragments 570 that includes MSDU fragment 571 and MSDU fragment 572. The MSDU fragments 561, 562, 571, 572 are then encapsulated into MPDU payloads 541, 542, 543, 544 (respectively), and MAC headers 511, 512, 513, 514 are appended to the MPDU payloads 541, 542, 543, 544 (respectively) to form the MPDUs 501, 502, 503, 504. The MAC headers 511, 512, 513, 514 include sequence control fields 531, 532, 533, 534 (respectively) and frame control fields 536, 537, 538, 539 (respectively). The sequence control fields 531, 532, 533, 534 specify sequence numbers identifying the relative positions of the corresponding MSDU 551, 552 within the sequence of MSDUs 550 and fragment numbers (FNs) identifying the relative position of the MSDU fragments 561, 562, 571, 572 within their respective sequence of MSDU fragments 560, 570. The frame control fields 536, 537, 538, 539 include more fragments bits (depicted as "MB"). The more fragments bits in the frame control fields 536, 538 are set to one (1) to indicate that the MSDU fragments 561, 571, are followed by the subsequent MSDU fragments (e.g., the MSDU fragments 562, 572, respectively) from the same fragmented MSDU (e.g., the MSDUs 551, 552), while the more fragments bits in the frame control fields 537, 539 are set to zero (0) to indicate that the MSDU fragments 562, 572 are not followed by any subsequent MSDU fragments corresponding to the same respective MSDU. For example, the sequence control field 531 includes a fragment number set to zero (FN=0) to indicate that that the MSDU fragment 561 is the first fragment in the sequence of MSDU fragments 560, and a sequence number set to one (SN=1) to indicate that the MSDU fragment 561 was formed from the first MSDU 551 in the sequence of MSDUs 550. The sequence control field 532 includes a fragment number set to one (FN=1) to indicate that that the MSDU fragment 562 is the second fragment in the sequence of MSDU fragments 560, and a sequence number set to one (SN=1) to indicate that the MSDU fragment 562 was also formed from the first MSDU 551 in the sequence of MSDUs 550. It should be appreciated that any number of MSDU fragments (e.g., two or more MSDU fragments) may be formed from a fragmented MSDU. It should be appreciated that a mix of MSDUs with a size less than the fragmentation threshold and MSDUs with a size greater than or equal to the fragmentation threshold may be included in a sequence of MSDUs received from the higher layer and be encoded into a sequence of MPDUs comprising MPDUs each encapsulating an unfragmented MSDU and MPDUs each encapsulating an MSDU fragment.

Conventional Wi-Fi link aggregation techniques using bonding driver software may allow MSDUs of different traffic streams to be communicated over different 802.11 links simultaneously, but may rely on link-specific sequence/fragment numbers that are unsuitable for reordering the MSDUs/MSDU fragments of a same traffic stream if received over different 802.11 links and out-of-order.

Figure 6A:
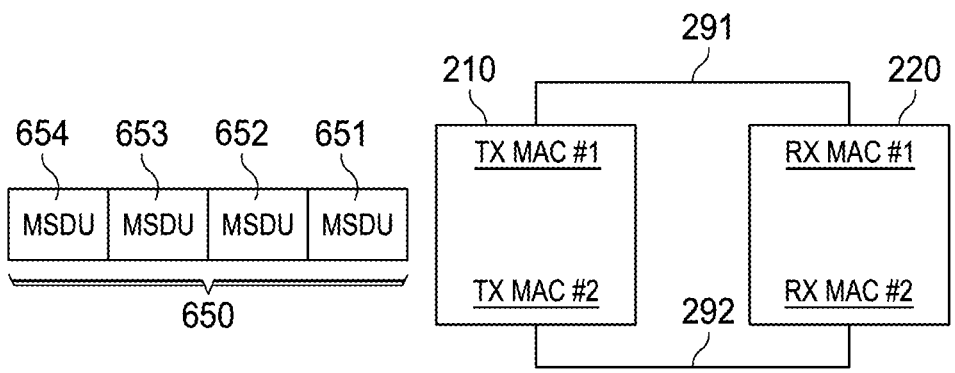
FIGS. 6A-6D illustrate an example of how non-transparent channel bonding would be implemented in an 802.11 link aggregation scenario.
Figure 6B:
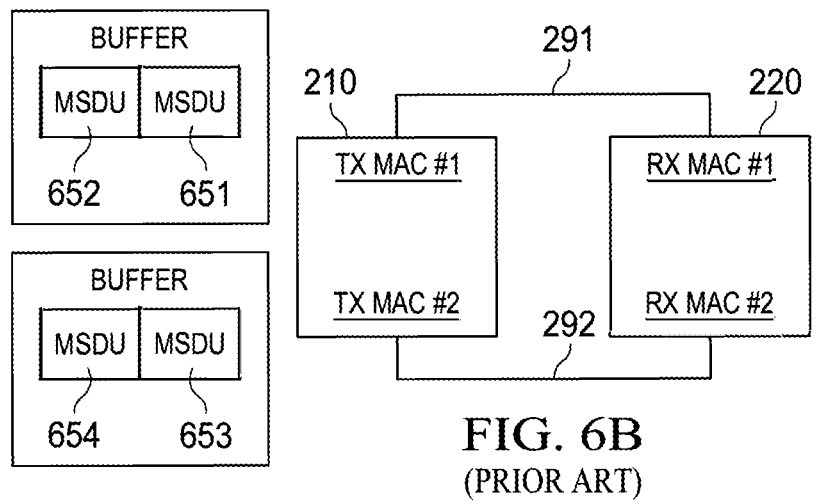
Figure 6D:
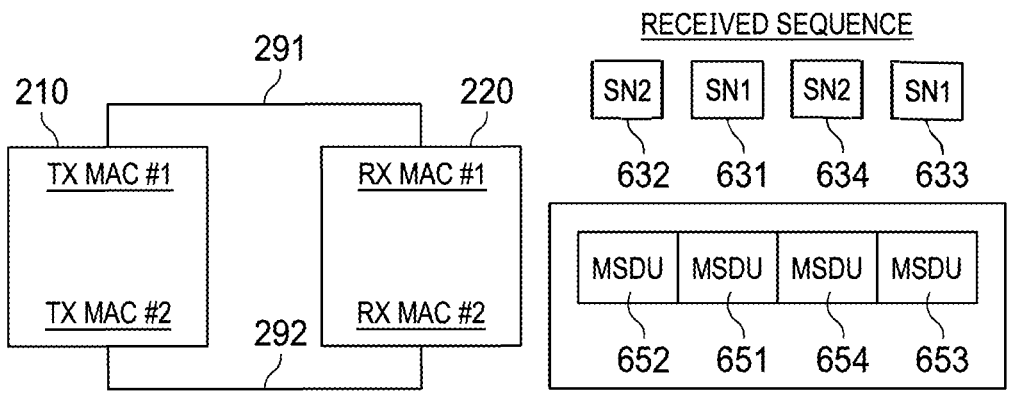
Figure 6C:
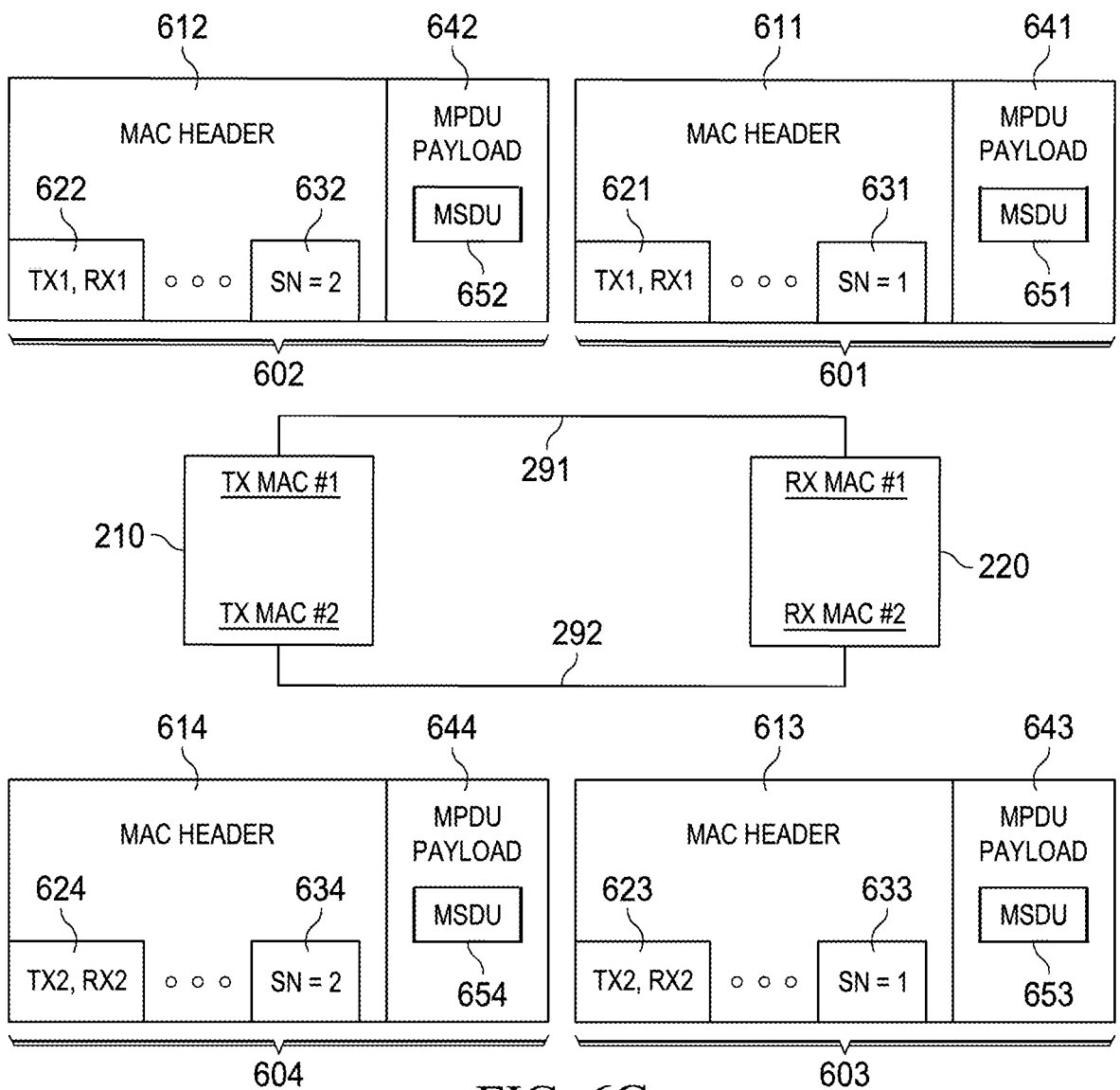

FIGS. 6A-6E illustrate an example of how bonding driver would be implemented in an 802.11 link aggregation scenario. As shown, a sequence of MSDUs 650 is received at the transmitting STA 210 in FIG. 6A, with MSDUs 651, 652 from the sequence of MSDUs 650 being distributed by the bonding driver to be transmitted over 802.11 link 291 and therefore stored in a transmit buffer associated with 802.11 link 291 and MSDUs 653, 654 from the sequence of MSDUs 650 being distributed by the bonding driver to be transmitted over 802.11 link 292 and therefore stored in a transmit buffer associated with 802.11 link 292 in FIG. 6B. In FIG. 6C, the MSDUs 651, 652, 653, 654 are encapsulated within MSDU payloads 641, 642, 643, 644 (respectively), MAC headers 611, 612, 613, 614 are appended to the MPDU payloads 641, 642, 643, 644 to form MPDUs 601, 602, 603, 604, and the MPDUs 601, 602 are transmitted over the 802.11 link 291 at the same time the MPDUs 603, 604 are transmitted over the 802.11 link 292. As shown, the MAC headers 611, 612, 613, 614 in the MPDUs 601, 602, 603, 604 include link-specific MAC address fields 621, 622, 623, 624 and link-specific sequence control fields 631, 632, 633, 634. Each of the link-specific MAC address fields 621, 622, 623, 624 include a pair of TX and RX MAC address fields associated with the specific 802.11 link over which the corresponding MPDU 601, 602, 603, 604 is transmitted. For example, the link-specific MAC address fields 621 indicates the TX MAC address #1 (TX1) and the RX MAC address #1 (RX1) associated with the 802.11 link 291, while the link-specific MAC address fields 623 indicates the TX MAC address #2 (TX2) and the RX MAC address #2 (RX2) associated with the 802.11 link 292. Moreover, each of the link-specific sequence control fields 631, 632, 633, 634 include a sequence number identifying an order in which the corresponding MPDU 601, 602, 603, 604 was communicated over the corresponding 802.11 link. In particular, the link-specific sequence control field 631 includes a sequence number set to one (SN=1) to indicate that the MPDU 601 was the first MPDU transmitted over the 802.11 link 291, the link-specific sequence control field 632 includes a sequence number set to two (SN=2) to indicate that the MPDU 602 was the second MPDU transmitted over the 802.11 link 291, the link-specific sequence control field 633 includes a sequence number set to one (SN=1) to indicate that the MPDU 603 was the first MPDU transmitted over the 802.11 link 293, and the link-specific sequence control field 634 includes a sequence number set to two (SN=2) to indicate that the MPDU 604 was the second MPDU transmitted over the 802.11 link 292.

In this example, the receiving STA 220 receives the MPDUs 603, 604 prior to the MPDUs 601, 602 due to, for example, conditions on the 802.11 links 291, 292, and (as shown in FIG. 6D) the receiving STA 220 obtains a received sequence of MSDUs that includes the following order: MSDU 653, MSDU 654, MSDU 651, MSDU 652. Because the link-specific sequence control fields 631, 632, 633, 634 only indicate the order in which the MPDUs were communicated over the specific 802.11 links, the receiving STA 220 is unable to re-order the MSDUs in the manner needed to decode the underlying traffic stream.

Embodiments of this disclosure achieve efficient re-ordering of MSDUs during 802.11 link aggregation by including link-independent sequence numbers in MAC headers of MPDUs. FIGS. 7A-7E illustrate an example of how embodiment link-independent sequence control fields allow for MSDU re-ordering during 802.11 link aggregation. In FIGS.

7A-7B, a sequence of MSDUs 750, which includes MSDUs 751-754, each with a size less than the fragmentation threshold, is received at the transmitting STA 210, after which sequence control fields 731, 732, 733, 734 and frame control fields 736, 737, 738, 739 are associated with the MSDUs 751, 752, 753, 754. The sequence control fields 731, 732, 733, 734 specify sequence numbers (SNs) identifying an order of the respective MSDU in the sequence of MSDUs 750. In particular, the sequence control field 731 includes a sequence number set to one (SN=1) to indicate that the MSDU 751 is the first MSDU in the sequence of MSDUs 750, the sequence control field 732 includes a sequence number set to two (SN=2) to indicate that the MSDU 752 is the second MSDU in the sequence of MSDUs 750, the sequence control field 733 includes a sequence number set to three (SN=3) to indicate that the MSDU 753 is the third MSDU in the sequence of MSDUs 750, and the sequence control field 734 includes a sequence number set to four (SN=4) to indicate that the MSDU 754 is the fourth MSDU in the sequence of MSDUs 750.

Figure 7A:
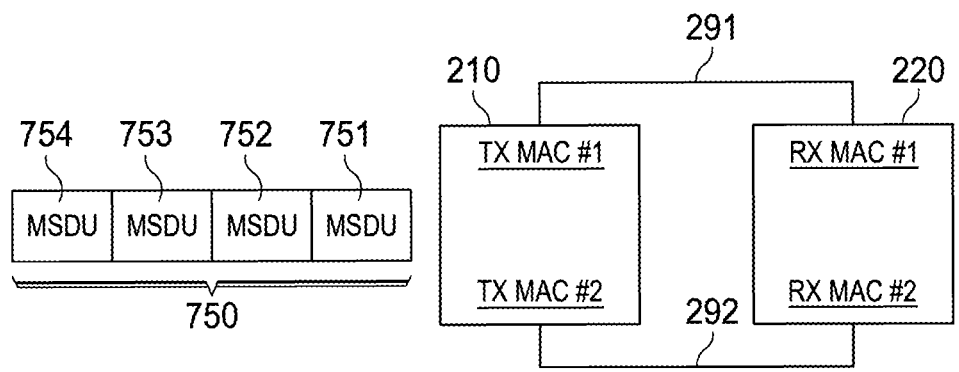
FIGS. 7A-7E illustrate an example of how embodiment link-specific sequence control fields allow for MSDU re-ordering when MSDUs are communicated over aggregated 802.11 links.
Figure 7B:
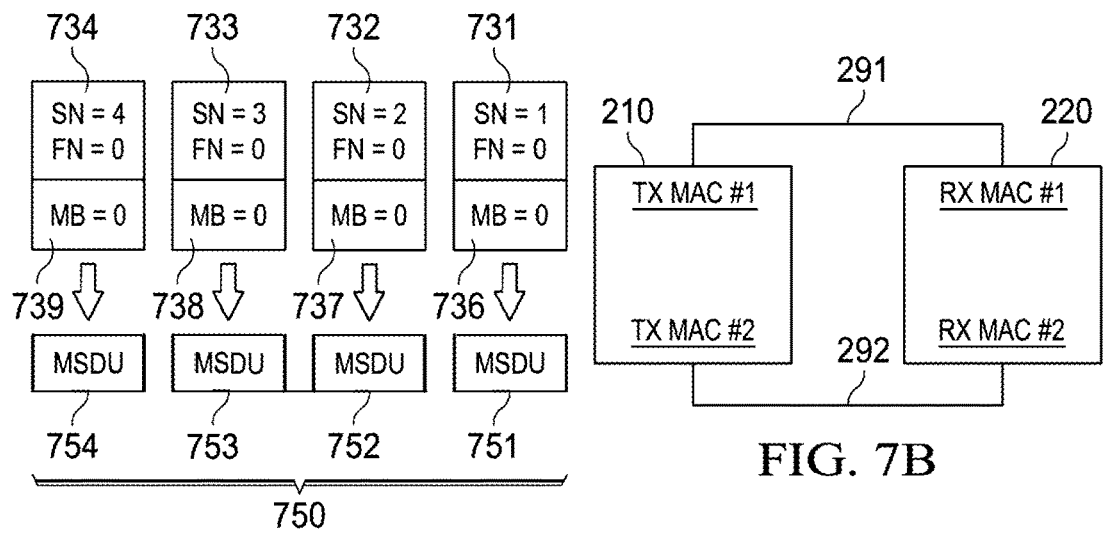
Figure 7C:
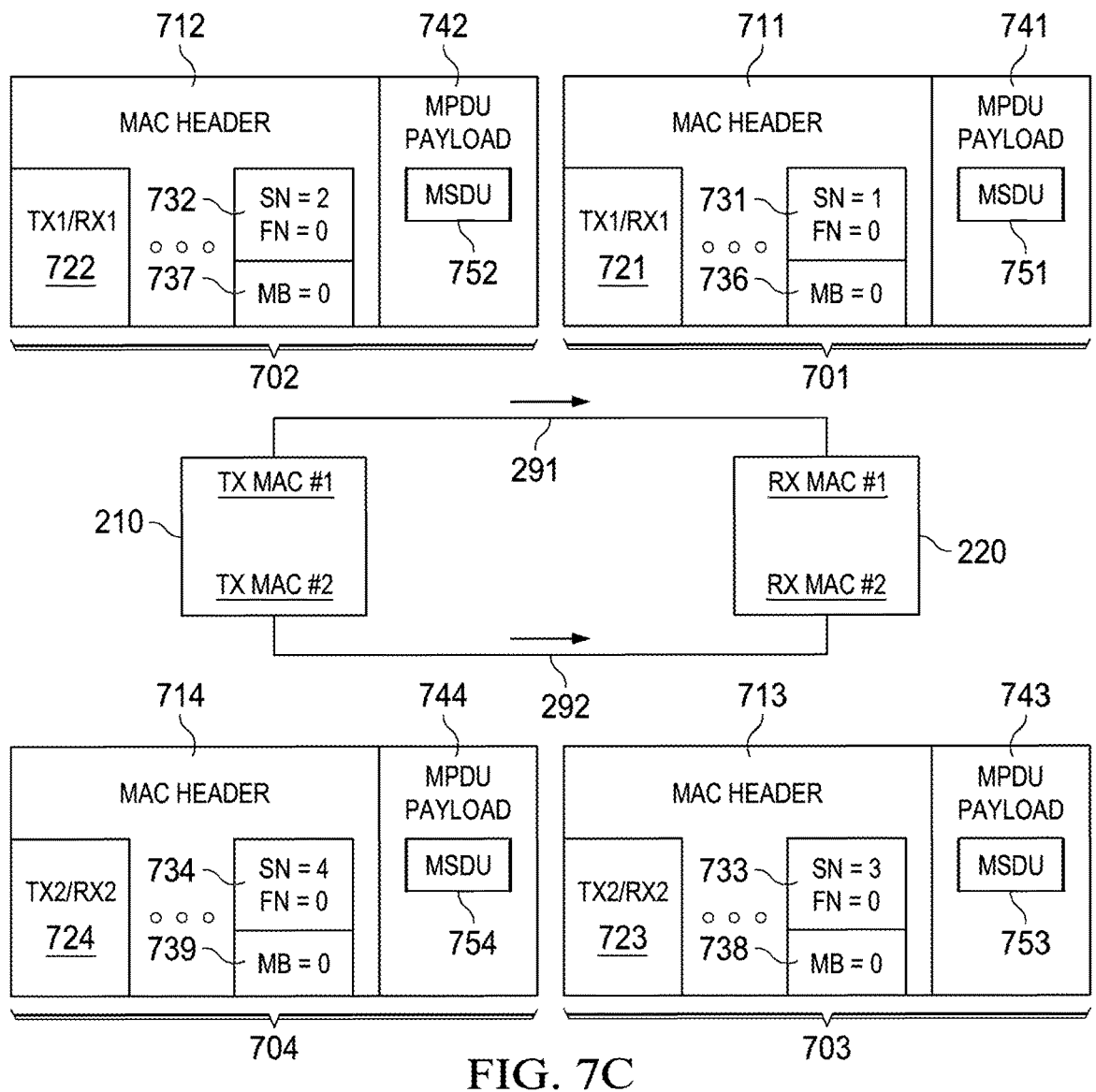

As shown in FIG. 7C, the MSDUs 751, 752, 753, 754 are encapsulated within MSDU payloads 741, 742, 743, 744 (respectively), and the sequence control fields 731, 732, 733, 734 (along with link-specific MAC address fields 721, 722, 723, 724) are encapsulated within MAC headers 711, 712, 713, 714. The MAC headers 711, 712, 713, 714 are then appended to the MPDU payloads 741, 742, 743, 744 to form MPDUs 701, 702, 703, 704, and the MPDUs 701, 702 are transmitted over the 802.11 link 291 at the same time the MPDUs 703, 704 are transmitted over the 802.11 link 292. The link-specific MAC address fields 721, 722, 723, 724 include a pair of TX and RX MAC address fields associated with the specific 802.11 link over which the corresponding MPDU 701, 702, 703, 704 is transmitted. For example, the link-specific MAC address fields 721 indicates the TX MAC address #1 (TX1) and the RX MAC address #1 (RX1) associated with the 802.11 link 291, while the link-specific MAC address fields 723 indicates the TX MAC address #2 (TX2) and the RX MAC address #2 (RX2) associated with the 802.11 link 292.

Figure 7D:
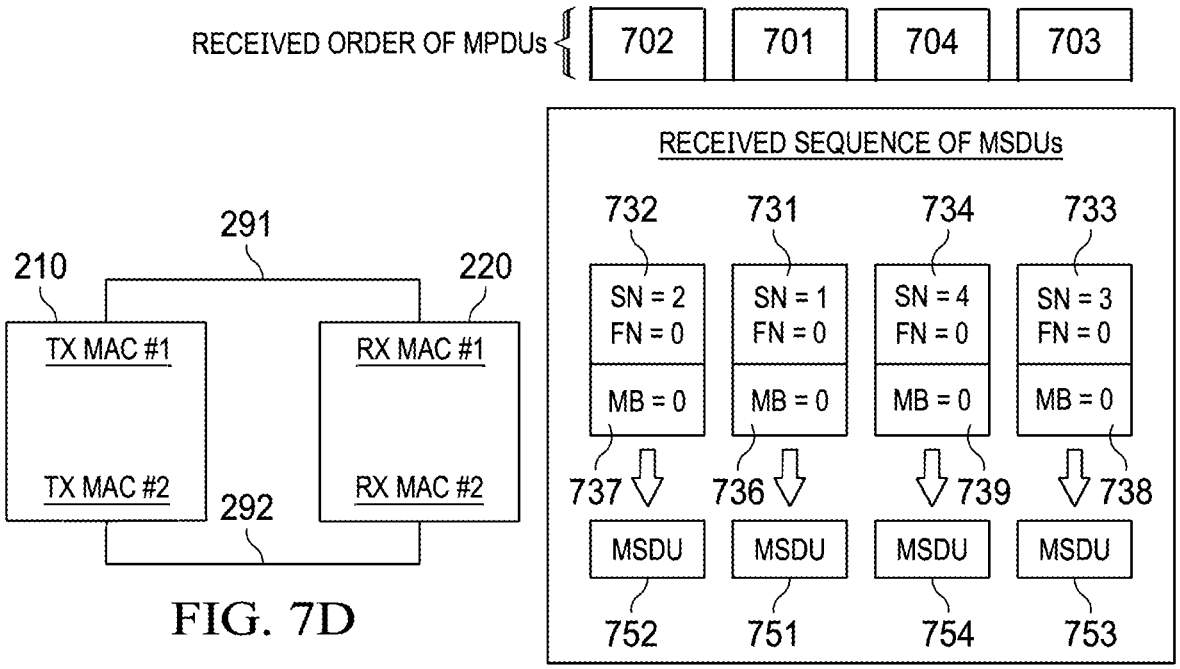
Figure 7E:
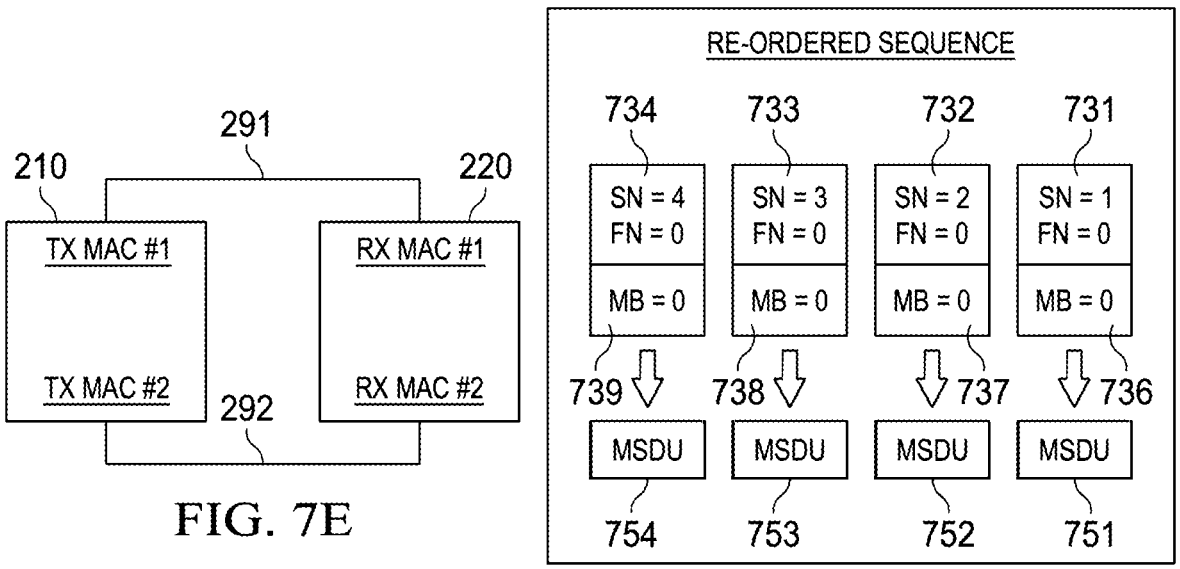

In this example, the receiving STA 220 receives the MPDUs 703, 704 prior to the MPDUs 701, 702. This may occur due to conditions on the 802.11 links 291, 292 or a retransmission of one or more of the MPDUs after an unsuccessful reception. As shown in FIG. 7D, due to the order in which the MPDUs 701-704 are received, the receiving STA 220 obtains a received sequence of MSDUs in the following order: MSDU 753, MSDU 754, MSDU 751, MSDU 752. The sequence control fields 731, 732, 733, 734 are link-independent, which allows the receiving STA 220 to re-order the MSDUs in the manner needed to decode the underlying traffic stream (as shown in FIG. 7E).

Figure 8A:
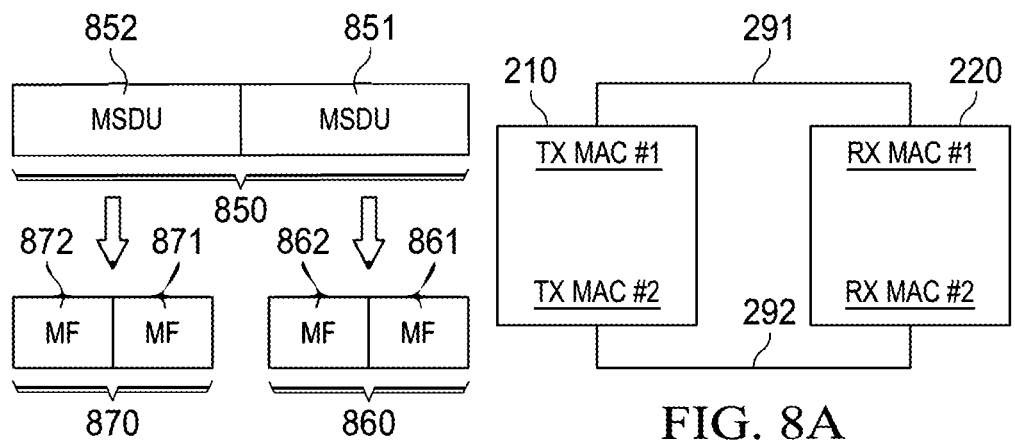
FIGS. 8A-8E illustrate an example of how embodiment link-specific sequence control fields allow for MSDU re-assembly when MSDU segments are communicated over aggregated 802.11 links.
Figure 8B:
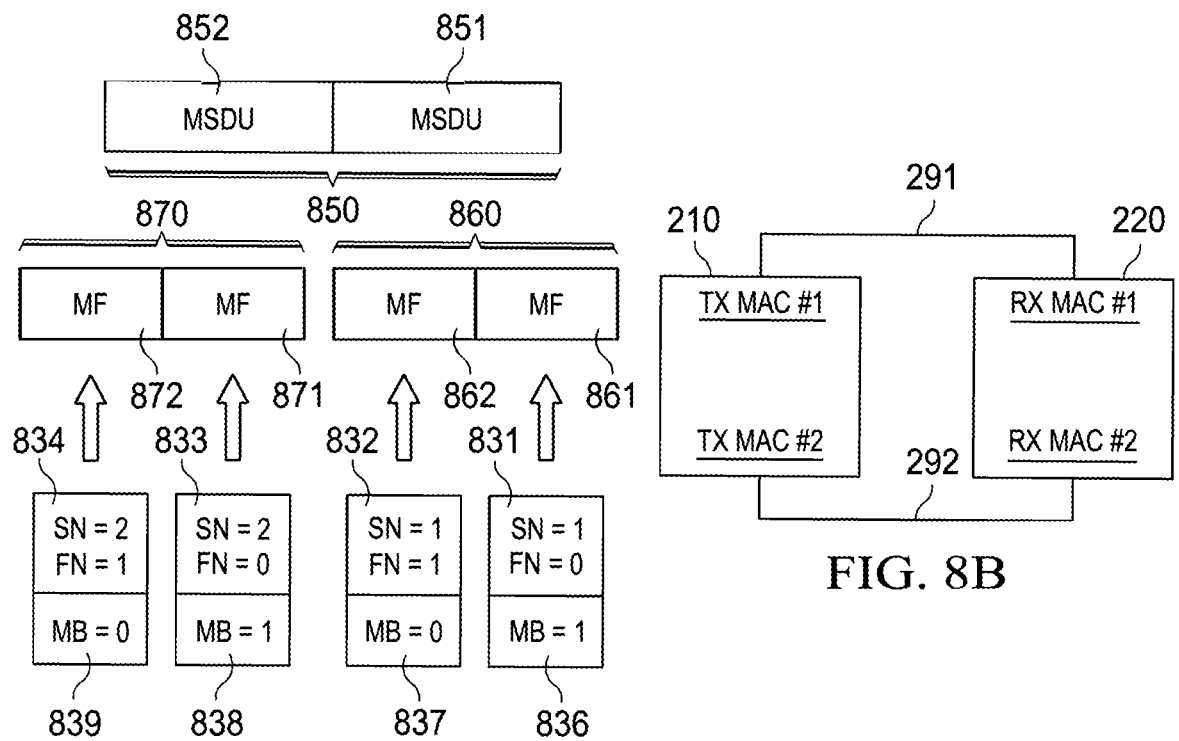

FIGS. 8A-8E illustrate an example of how embodiment link-independent sequence control fields allow for MSDU fragment re-assembly during 802.11 link aggregation. In FIG. 8A, a sequence of MSDUs 850 including MSDUs 851, 852, each with a size greater than or equal to the fragmentation threshold, is received at the transmitting STA 210. The MSDU 851 is fragmented into a sequence of MSDU fragments 860 that includes MSDU fragment 861 and MSDU fragment 862, and the MSDU 852 is fragmented into a sequence of MSDU fragments 870 that includes MSDU fragment 871 and MSDU fragment 872. In FIG. 8B, sequence control fields 831, 832, 833, 834 are associated with the MSDU fragments 861, 862, 871, 872. The sequence control field 831 includes a sequence number set to one (SN=1) to indicate that the MSDU fragment 861 is associated with the first MSDU (i.e., MSDU 851) in the sequence of MSDUs 850 and a fragment number set to zero (FN=0) to indicate that that the MSDU fragment 861 is the first MSDU fragment in the sequence of MSDU fragments 860, while the frame control field 836 includes a more fragments bit set to 1 to indicate the MSDU fragment 861 is followed by subsequent MSDU fragments in the sequence of MSDU fragments 860. Likewise, the sequence control field 832 includes a sequence number set to one (SN=1) to indicate that the MSDU fragment 862 is associated with the first MSDU (i.e., MSDU 851) in the sequence of MSDUs 850 and a fragment number set to one (FN=1) to indicate that that the MSDU fragment 862 is the second MSDU fragment in the sequence of MSDU fragments 860, while the frame control field 837 includes a more fragments bit set to zero (MB=0) to indicate that the MSDU fragment 862 is the last MSDU fragment in the sequence of MSDU fragments 860. The sequence control field 833 includes a sequence number set to two (SN=2) to indicate that the MSDU fragment 871 is associated with the second MSDU (i.e., MSDU 852) in the sequence of MSDUs 850 and a fragment number set to zero (FN=0) to indicate that the MSDU fragment 871 is the first MSDU fragment in the sequence of MSDU fragments 870, while the frame control field 838 includes a more fragments bit being set to one (MB=1) to indicate that the MSDU fragment 871 is followed by subsequent MSDU fragments in the sequence of MSDU fragments 870. The sequence control field 834 includes a sequence number set to two (SN=2) to indicate that the MSDU fragment 872 is associated with the second MSDU (i.e., MSDU 852) in the sequence of MSDUs 850 and a fragment number set to one (FN=1) to indicate that that the MSDU fragment 872 is the second MSDU fragment in the sequence of MSDU fragments 870, while the frame control field 836 includes a more fragments bit set to zero (MB=0) to indicate that the MSDU fragment 872 is the last MSDU fragment in the sequence of MSDU fragments 870.

Figure 8C:
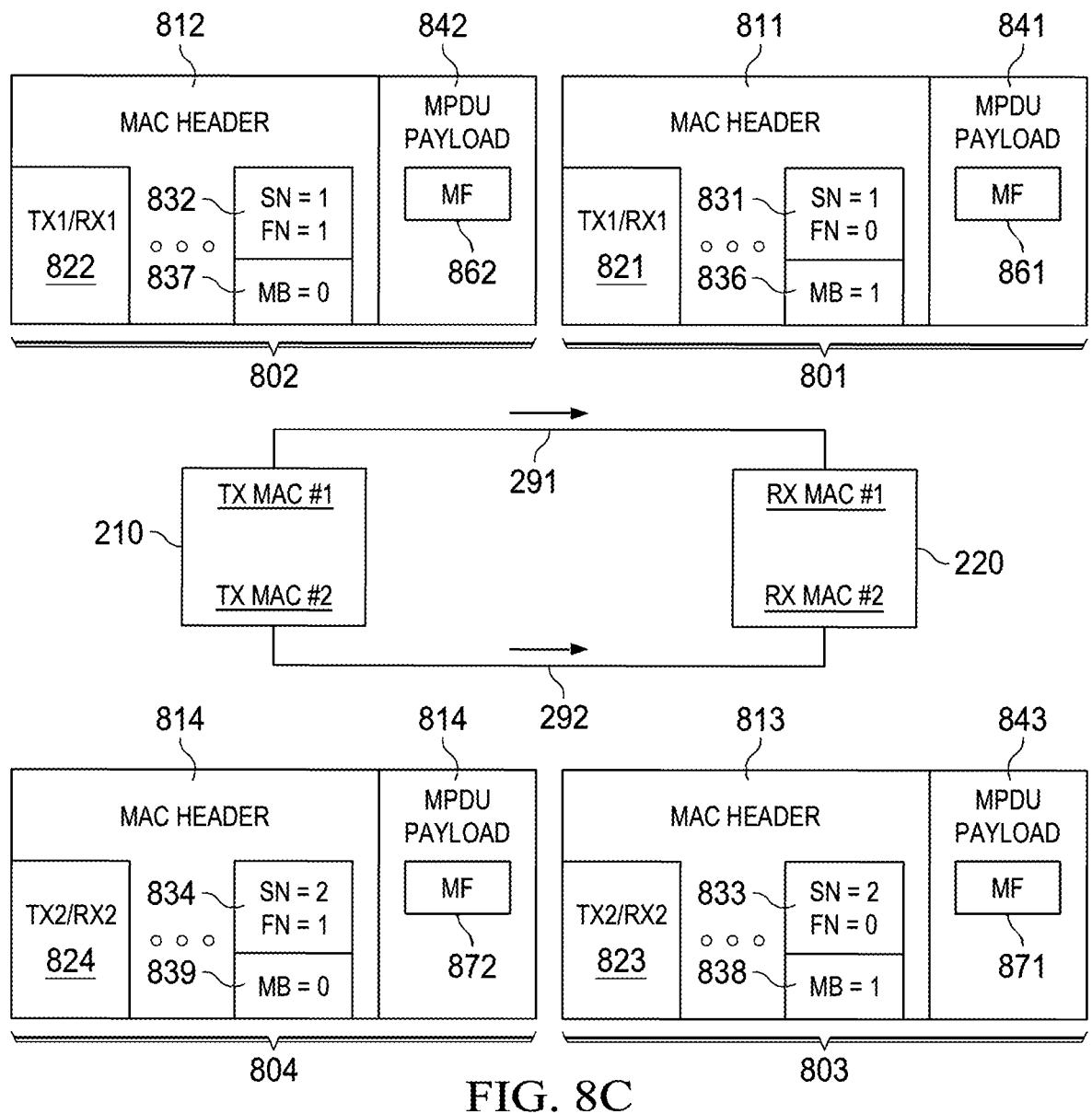

As shown in FIG. 8C, the MSDU fragments 861, 862, 871, 872 are encapsulated within MSDU payloads 841, 842, 843, 844 (respectively), while the sequence control fields 831, 832, 833, 834, the frame control fields 836, 837, 838, 839, and the link-specific MAC address fields 821, 822, 823, 824 are encapsulated within MAC headers 811, 812, 813, 814. The MAC headers 811, 812, 813, 814 are then appended to the MPDU payloads 841, 842, 843, 844 to form MPDUs 801, 802, 803, 804, and the MPDUs 801, 802 are transmitted over the 802.11 link 291 at the same time the MPDUs 803, 804 are transmitted over the 802.11 link 292. The link-specific MAC address fields 821, 822, 823, 824 include a pair of TX and RX MAC address fields associated with the specific 802.11 link over which the corresponding MPDU 801, 802, 803, 804 is transmitted. For example, the link-specific MAC address fields 821 indicates the TX MAC address #1 (TX1) and the RX MAC address #1 (RX1) associated with the 802.11 link 291, while the link-specific MAC address fields 823 indicates the TX MAC address #2 (TX2) and the RX MAC address #2 (RX2) associated with the 802.11 link 292.

Figure 8D:
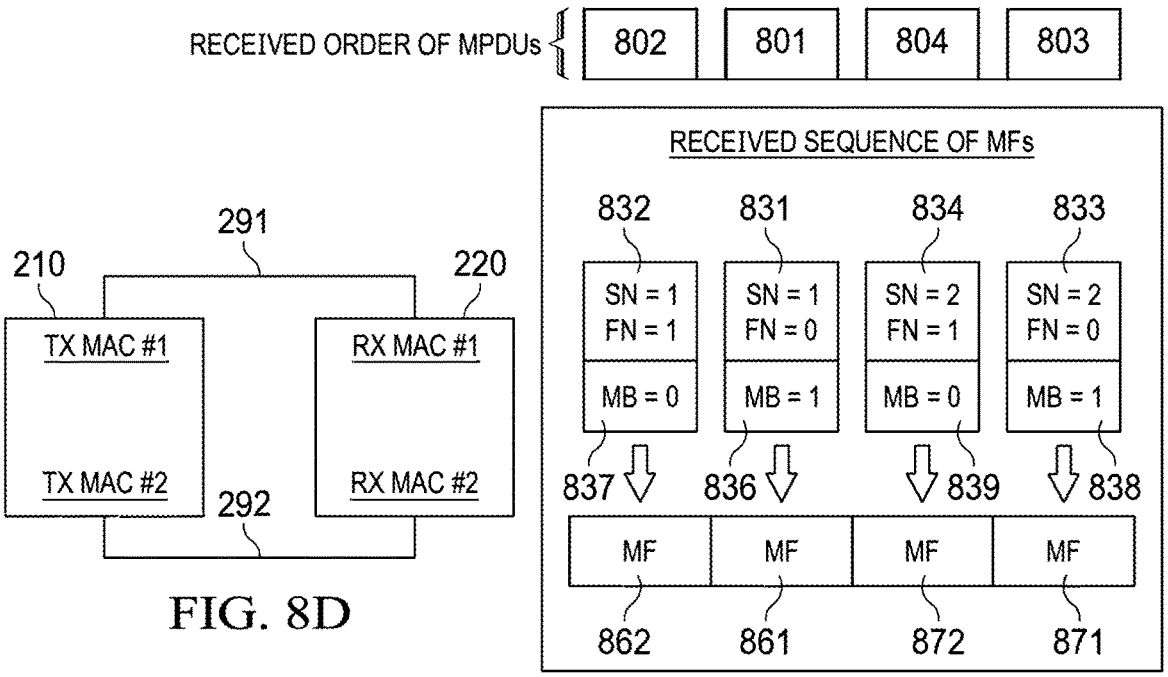
Figure 8E:
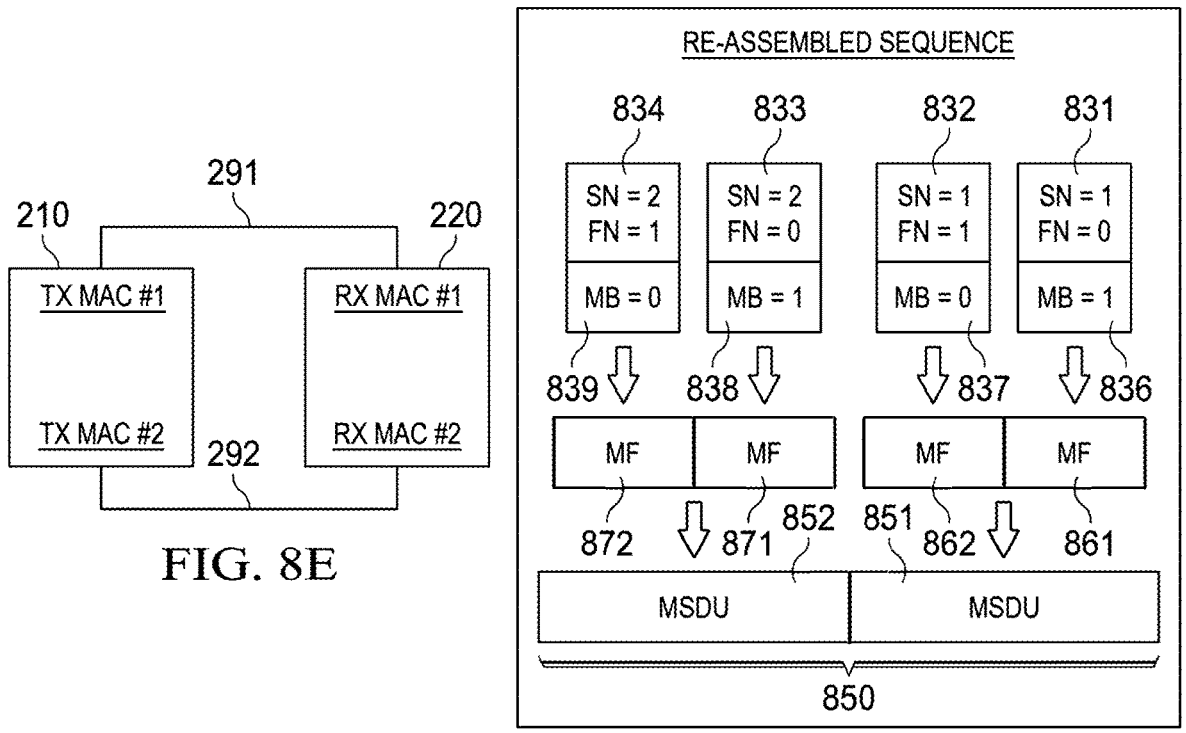

In this example, the receiving STA 220 receives the MPDUs 803, 804 prior to the MPDUs 801, 802, and due to the order in which the MPDUs 801-804 are received, the receiving STA 220 obtains a received sequence of MSDU fragments in the following order: MSDU fragment 871, MSDU fragment 872, MSDU fragment 861, MSDU fragment 862 (as shown in FIG. 8D). The sequence control fields 831, 832, 833, 834 and the frame control fields 836, 837, 838, 839 are link-independent, which allows the receiving STA 220 to re-assemble the MSDUs 851, 852, respectively, and decode the underlying traffic stream (as shown in FIG. 8E). As used herein, a "received sequence of MSDU segments" refers to all MSDU segments, relating to the same traffic stream, that are received over a group/set of aggregated 802.11 links during a given period. It should be appreciated that MSDU segments that are received over different 802.11 links may be buffered separately and/or arranged into their own subsequence for a period of time following reception prior to a reordering/reassembly operation. However, for purposes of this disclosure, those MSDU segments would nevertheless be considered part of the same "received sequence of MSDU segments" so long as they were related to the same traffic stream and received over one of the 802.11 links in an aggregated set of 802.11 links during a common period. As an example, although the MSDUs 751 and 752 are transmitted over a different 802.11 link than the MSDUs 753, 754 in FIG. 7C, upon reception, all of the MSDUs 753, 754, 751, 752 are part of the same received sequence of MSDUs (as shown in FIG. 7D). A similar observation can be made about the MSDU fragments 861, 862, 871, 872 depicted in FIGS. 8C-8D.

Figure 9:
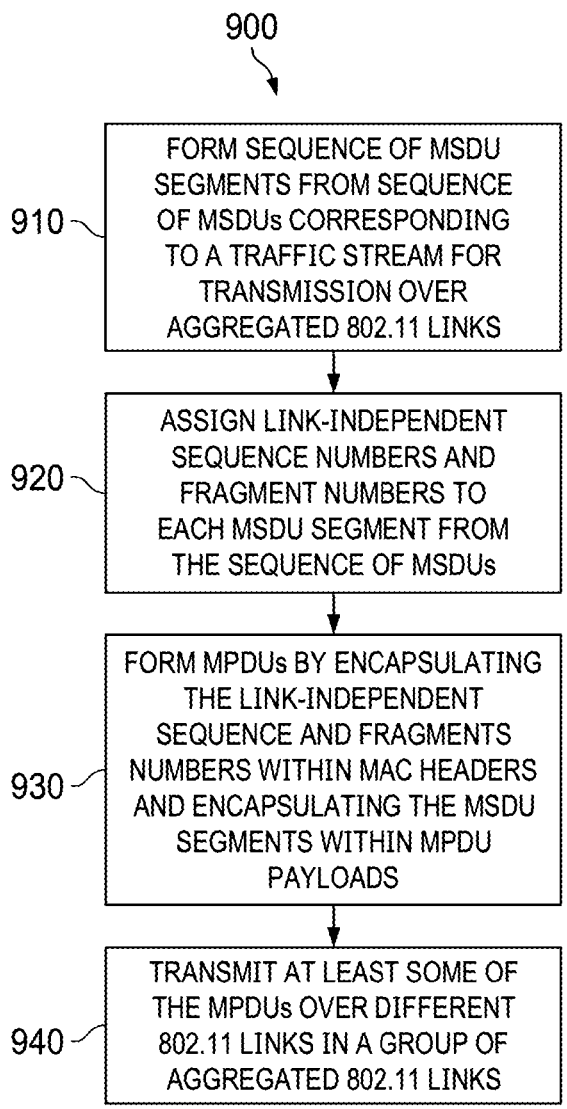
FIG. 9 is a flowchart for transmitting MSDU segments over aggregated 802.11 links.

FIG. 9 is a flowchart of an embodiment method 900 for transmitting MSDU over aggregated 802.11 links, as may be performed by a transmitter, e.g., STA 210. At step 910, the transmitter forms a sequence of MSDU segments from a sequence of MSDUs corresponding to a traffic stream for transmission over the 802.11 links. The sequence of MSDUs may be received from a higher layer. The transmitter may form the sequence of MSDU segments by fragmenting MDSUs having a size greater than or equal to the fragmentation threshold into MSDU fragments such that each fragment forms an MSDU segment while maintaining MSDUs having a size less than the fragmentation threshold unfragmented such that each unfragmented MSDU forms an MSDU segment. At step 920, the transmitter assigns each MSDU segment in the sequence of MSDU segments a link-independent sequence number and/or fragment number. At step 930, the transmitter forms MPDUs by encapsulating the link-independent sequence and/or fragment numbers in MAC headers and by encapsulating the MSDU segments into MPDU payloads. At step 940, the transmitter transmits at least some of the MPDUs over different 802.11 links in a group of aggregated 802.11 links.

Figure 10:
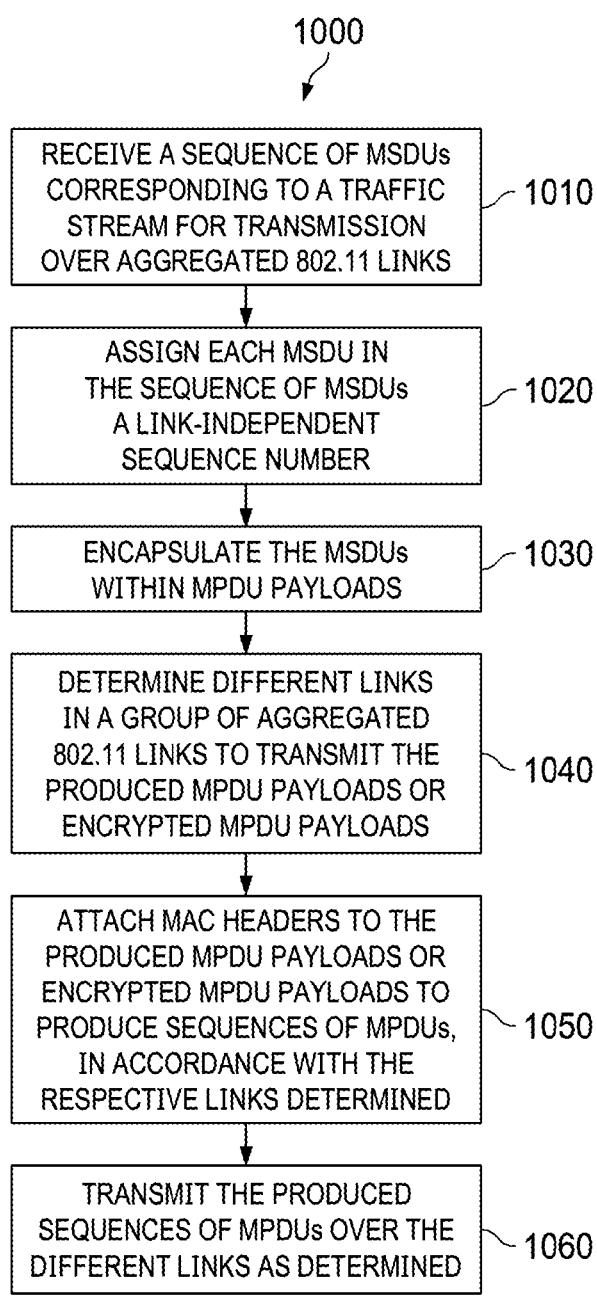
FIG. 10 is a flowchart of another embodiment method for transmitting MSDU segments over aggregated 802.11 links.

FIG. 10 is a flowchart of an embodiment method woo for transmitting MSDUs over aggregated 802.11 links, as may be performed by a transmitter, e.g., STA 210. At step 1010, the transmitter receives a sequence of MSDUs corresponding to a traffic stream. The transmitter may receive the sequence of MSDUs corresponding to the traffic stream from the higher layer. At step 1020, the transmitter assigns each MSDU in the sequence of MSDUs a link-independent sequence number. At step 1030, the transmitter encapsulates the MSDUs within MPDU payloads. The transmitter may fragment each MSDU (of the sequence of MSDUs) having a size greater than or equal to the fragmentation threshold into one or more MSDU fragments, where each MSDU fragment has a size less than the fragmentation threshold and is assigned with a link-independent fragment number identifying their relative locations within the same MSDU. The transmitter may maintain each MSDU (of the sequence of MSDUs) having a size less than the fragmentation threshold unfragmented and assign it with a fragment number of 0 and a more fragments bit of 0, indicating that the MSDU is unfragmented. The transmitter may then encapsulate each resultant MSDU fragment and each unfragmented MSDU into an MPDU payload, respectively. The transmitter may encrypt each resultant MPDU payload in accordance with a link-independent security key and a pair of common TX and RX MAC addresses, to produce an encrypted MPDU payload. At step 1040, the transmitter determines different links in a group of aggregated 802.11 links to transmit the produced MPDU payloads or encrypted MPDU payloads. The transmitter may determine the different links based on availabilities of the different links through contention processes on each of the different links and a first-come-first-serve policy. The transmitter may determine the different links based on a transmission capacity (such as a data rate and an allowable duration) of each of the different links, so as to determine how many (and thereby which) produced MPDU payloads or encrypted MPDU payloads to assign to the each of the different links. The transmitter may determine the different links base on whether duplicated transmissions are needed. The transmitter may determine the different links based on whether the transmission of an MPDU payload is for an initial transmission or a re-transmission. For example, the transmitter may prioritize an MPDU payload that is to be re-transmitted, so that it is transmitted over the first link that becomes available. At step 1050, the transmitter attaches MAC headers to the produced MPDU payloads or encrypted MPDU payloads to produce a sequence of MPDUs, in accordance with the respective links determined. The transmitter may form a MAC header for each MPDU payload or encrypted MPDU payload by including, in the MAC header, a pair of link-dependent TX and RX MAC addresses in accordance with a link determined to be used for the transmission of that corresponding payload. The transmitter may further include, in each MAC header, a sequence number, a fragment number, a more fragments bit, and a retry field associated with the corresponding payload. At step 1060, the transmitter transmits the produced sequence of MPDUs over the different links as determined.

FIG. 11 is a flowchart of an embodiment method 1100 for receiving MSDUs over aggregated 802.11 links, as may be performed by a receiver, e.g., STA 220. At step 1110, the receiver receives MPDUs over different 802.11 links in a group of aggregated 802.11 links. At step 1120, the receiver obtains a received sequence of MSDU segments from MPDU payloads in the received MPDUs. At step 1130, the receiver reassembles and re-orders the MSDUs from the received sequence of MSDU segments based on link-independent sequence and/or fragment numbers in MAC headers of the received MPDUs. At step 1140, the receiver decodes the re-assembled/re-ordered sequence of MSDUs to obtain a traffic stream. In some embodiments, the receiver may determine that a retry field indicates that the corresponding MPDU payload is a retransmission of a previous MPDU payload (e.g., the retry field is set to one) such that a common MSDU segment is encapsulated within both the instant MPDU payload and the previous MPDU payload. In such cases, if the common MSDU segment was obtained from the previous MPDU payload, the receiver may drop the instant MPDU payload without obtaining the common MSDU segment from the instant MPDU payload. This may conserve power and processing resources by reducing the amount of MPDU payloads that need to be decoded.

FIG. 12 is a flowchart of an embodiment method 1200 for receiving MSDUs over aggregated 802.11 links, as may be performed by a receiver, e.g., STA 220. At step 1210, the receiver receives MPDUs over different 802.11 links in a group of aggregated 802.11 links. The receiver may have previously configured, with a transmitter, the group of aggregated 802.11 links for communicating the MSDUs of the traffic stream. The receiver may receive the MPDUs based on link-dependent TX and RX MAC addresses. At step 1220, the receiver obtain a received sequence of MSDU fragments and unfragmented MSDUs from MPDU payloads in the received MPDUs. The receiver may detect and remove duplicated MPDU payloads based on the sequence numbers, the fragment numbers, and the retry fields in the MAC headers of corresponding MPDUs. The receiver may identify the unfragmented MSDUs from the MPDU payloads based on a fragment number being 0 and a more fragments bit being 0 in the MAC headers of the corresponding MPDUs. The receiver may decrypt the MPDU payloads in the received MPDUs, in accordance with a link-independent security key and a pair of common TX and RX MAC addresses, to produce the received sequence of MSDU fragments and unfragmented MSDUs. The receiver may replace the link-dependent TX and RX MAC addresses in the MAC headers of the corresponding MPDUs with the common pair of TX and RX MAC addresses before performing the decryption. At step 1230, the receiver re-orders the received sequence of MSDU fragments and unfragmented MSDUs based on the link-independent sequence numbers in the MAC headers of the corresponding MPDUs. At step 1240, the receiver re-assembles MSDUs from the MSDU fragments based on the link-independent sequence numbers and fragment numbers in the MAC headers of the corresponding MPDUs. The receiver may identify MSDU fragments belonging to a same MSDU based in a common link-independent sequence number that they share in their corresponding MAC headers, and then re-assemble the identified MSDU fragments in an order indicated by their respective fragment numbers to produce a re-assembled MSDU. At step 1250, the receiver delivers the re-ordered MSDUs consisting the re-assembled and unfragmented MSDUs as a traffic stream to the higher layer.

In some embodiments, the receiver may determine that a retry field indicates that the corresponding MPDU payload is a retransmission of a previous MPDU payload (e.g., the retry field is set to one) such that a common MSDU segment is encapsulated within both the instant MPDU payload and the previous MPDU payload. In such cases, if the common MSDU segment was obtained from the previous MPDU payload, the receiver may drop the instant MPDU payload without obtaining the common MSDU segment from the instant MPDU payload.

In some embodiments, the STA 220 may send a block acknowledgement (BA) message to the STA 210 over one of both the 802.11 links 291, 292 as a response to receiving a block acknowledgement request (BAR) message from STA 210, as may occur after the STA 210 has transmitted the MSDUs 701-704 and/or MSDUs 801-804 to STA 220 over the aggregated 802.11 links 291, 292. FIG. 13 is a diagram of a BA message 1300 that includes a MAC address header 1310 and fields 1351-1354. The MAC address header 1310 includes TX/RX MAC addresses, wherein the TX MAC address field would contain the MAC address of the BA-transmitting STA (which is also the MSDU-receiving STA), such as STA 220, and the RX MAC address field would contain the MAC address of the BA-receiving STA (which is also the MSDU-transmitting STA), such as STA 210. Each of the fields 1351-1354 indicate whether a corresponding MSDU segment was successfully received over the aggregated 802.11 links 291, 292. For example, in the context of FIGS. 7C and 8D, the field 1351 may indicate whether the MSDU 751 or MSDU fragment 861 was successfully received over the 802.11 link 291, the field 1352 may indicate whether the MSDU 752 or MSDU fragment 862 was successfully received over the 802.11 link 291, the field 1353 may indicate whether the MSDU 753 or MSDU fragment 871 was successfully received over the 802.11 link 292, and the field 1354 may indicate whether the MSDU 754 or MSDU fragment 872 was successfully received over the 802.11 link 292. In an embodiment, the fields 1351-1354 are bits in a bitmap carried by the BA message 1300.

Embodiments of this disclosure achieve efficient re-ordering of MSDU segments during 802.11 link aggregation by including link-independent sequence numbers and link-independent fragment numbers in MAC headers of MPDUs.

Figure 14:
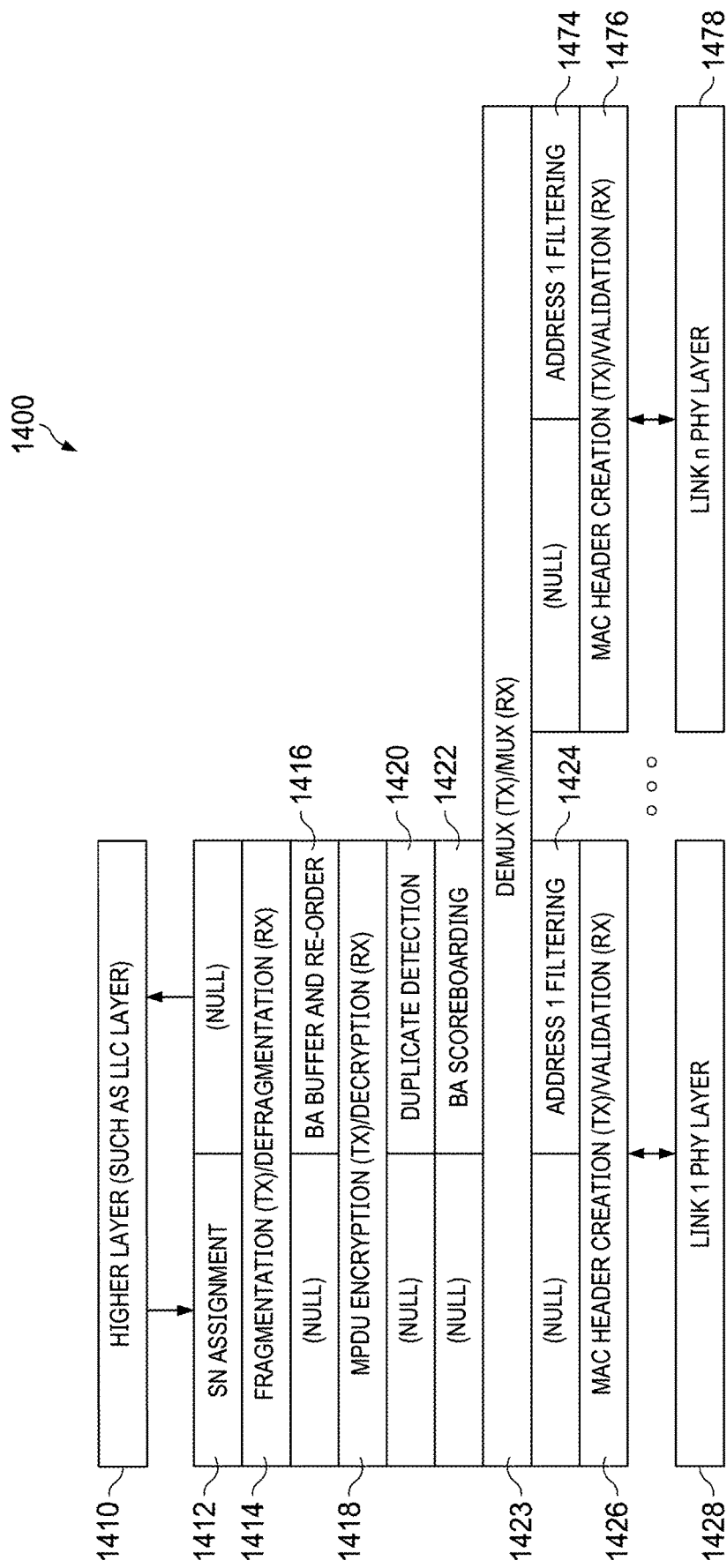
FIG. 14 is a diagram of an embodiment 802.11 protocol stack described herein.

FIG. 14 is a diagram of an embodiment 802.11 protocol stack 1400. As shown, the 802.11 protocol stack 1400 includes a first PHY layer entity 1428 for a first 802.11 link (which is denoted as Link 1), a second PHY layer entity 1478 for a second 802.11 link (which is denoted as Link n), first lower MAC processing blocks 1424-1426 interfacing with the first PHY layer entity 1428, second lower MAC processing blocks 1474-1476 interfacing with the second PHY layer entity 1478, a de-multiplexing (DEMUX) and multiplexing (MUX) block 1423 interfacing with both the first lower MAC processing blocks 1424-1426 and the second lower MAC processing blocks 1474-1476, upper MAC processing blocks 1412-1422 interfacing with the DEMUX/MUX block 1423, and a higher layer (such as LLC layer) entity 1410 interfacing with the upper MAC processing blocks 1412-1422. Although, only the lower MAC and PHY processing chains of two links are shown in FIG. 14, any number of lower MAC and PHY processing chains are possible, wherein they all share the same upper MAC processing chain through the distribution (in the transmitting direction) and aggregation (in the receiving direction) functions provided by the DEMUX/MUX block 1423. Some functional blocks, such as Fragmentation/Defragmentation block 1414 and MPDU Encryption/Decryption block 1418 are each illustrated as a single block performing opposite functions between the transmitting and receiving directions. Some other functional blocks, such as SN Assignment block 1412 on the transmitting direction, and on the receiving direction, BA buffer and re-order block 1416, Duplicate Detection block 1420, BA Scoreboarding block 1422, and Address 1 Filter blocks 1424 and 1474, don't have a counterpart in the opposite direction, and therefore is illustrated with a Null counterpart block in the opposite direction.

In the transmitting direction (shown with a downward arrow), MSDUs of a traffic stream arrives from the higher layer 1410. Then, the SN Assignment block 1412 assigns a sequence number to each successive MSDU in an incremental manner. Fragmentation/Defragmentation block 1414 fragments each MSDU that has a size greater than or equal to the fragmentation threshold into more than one MSDU fragments, each fragment having a size less than the fragmentation threshold. Fragmentation/Defragmentation block 1414 maintains each MSDU that has a size less than the fragmentation threshold intact. The MSDU fragments and the unfragmented MSDUs each forms an MSDU segment, which is then encapsulated into an MPDU payload. When data confidentiality and integrity are required, MPDU Encryption/Decryption block 1418 encrypts each MPDU payload with a common security key and a common pair of TX and RX MAC addresses to produce an encrypted MPDU payload. DEMUX/MUX block 1423 selects, for each (encrypted) MPDU payload, a link among the multiple links, such as Link 1 and Link n shown in FIG. 14, over which the corresponding MPDU payload is to be transmitted, and then forwards that MPDU payload to the lower MAC processing blocks of the link as selected. DEMUX/MUX block 1423 may distribute MPDU payloads among the different links without duplication in order to increase throughput. Alternatively, DEMUX/MUX block 1423 may duplicate at least some MPDU payloads and forwards the duplicated MPDU payloads to more than one link in order to reduce packet loss through redundancy. Depending on which link is selected for the transmission of an MPDU payload, MAC header creation/validation block 1426 or 1476 appends a MAC header that contains the link-specific TX and RX MAC addresses and link-independent sequence control field to the MPDU payload to form the MPDU. Then, the MPDU is passed onto the corresponding PHY layer entity 1428 or 1478 for PHY processing and the transmission. The PHY processing may include appending a PHY header to the MPDU to form a PHY PDU (PPDU) before transmitting the PPDU over the air.

In the receiving direction (shown with an upward arrow), PPDUs are received over the air by PHY layer entities 1428 and 1478. Then, MPDUs are obtained from the received PPDUs after removing the PHY headers and are forwarded to the correspond MAC header creation/validation blocks 1426 and 1476, respectively, for MAC header validation. After the MAC headers are successfully validated, the Address 1 Filtering blocks 1424 and 1474 determines whether the received MPDUs are intended for the device (such as STA 220) or not, based on a MAC address contained in the RX MAC address field (which is also referred to as the Address 1 field) in the MAC headers of the corresponding received MPDUs. If the MPDUs are intended for the device, e.g., the MAC address contained in the RX MAC address field in the corresponding received MAC header matches the MAC address of the data-receiving STA (such as STA 220), the MPDUs are forwarded to DEMUX/MUX block 1423. DEMUX/MUX block 1423 forwards MPDUs received from the lower MAC processing blocks of multiple links to the common upper MAC processing blocks 1412-1422. DEMUX/MUX block 1423 may convert the link-specific pair of TX and RX MAC addresses contained in the MAC headers of the MPDUs to the common pair of TX and RX MAC addresses before forwarding the MPDUs to the common upper MAC processing blocks 1412-1422, to ensure proper decryption. BA Scoreboarding block 1422 records the reception of MSDU segments in accordance with the sequence/fragment numbers in the corresponding MAC headers. Duplicate Detection block 1420 detects and removes duplicated MPDU payloads in accordance with the sequence/fragment numbers and the retry bits in the corresponding MAC headers. When the received MPDU payloads are encrypted, for example, as indicated by a Protected Frame bit of the Frame Control field (such as Frame Control fields 536-539) in the corresponding received MAC headers being set to 1 (by the transmitter such as STA 210), MPDU Encryption/Decryption block 1418 decrypts the encrypted MPDU payloads with the common security key and the common pair of TX and RX MAC addresses to produce the MPDU payloads in plaintext. BA buffer and re-order block 1416 re-orders the MSDU segments extracted from the (plaintext) MPDU payloads in accordance with the sequence and fragment numbers in the corresponding MAC headers. Fragmentation/Defragmentation block 1414 re-assembles MSDUs from MSDU fragments among the re-ordered MSDU segments in accordance with the sequence/fragment numbers and the more fragments bits in the corresponding MAC headers, then delivers a sequence of re-ordered whole MSDUs as a traffic stream to the higher layer for further processing (such as decoding), the whole MSDUs including re-assembled MSDUs and unfragmented MSDUs.

Figure 15:
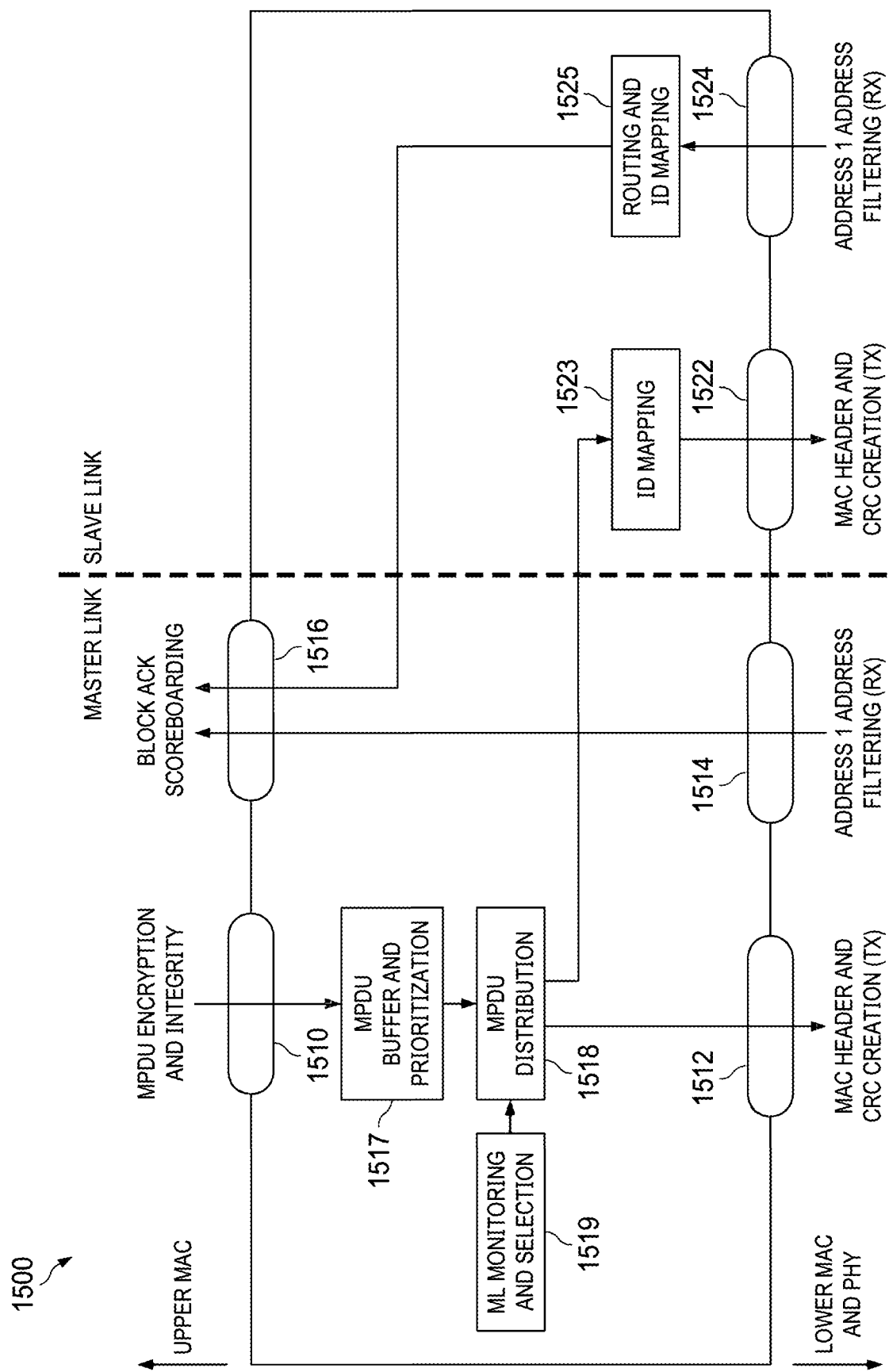
FIG. 15 is a block diagram of an embodiment de-multiplexing (DEMUX) and multiplexing (MUX) block described herein.

FIG. 15 illustrates a block diagram of DEMUX/MUX block 1500. DEMUX/MUX block 1500 may be an example embodiment of DEMUX/MUX block 1423 as in FIG. 14. As shown, DEMUX/MUX block 1500 includes service access points (SAPs) 1510, 1512, 1514, 1516, 1522, and 1524, an MPDU Buffer and Prioritization unit 1517, an MPDU Distribution unit 1518, a Multi-link (ML) Monitoring and Selection unit 1519, and identifier (ID) mapping units 1523 and 1525. Although, only two links (denoted as Master Link and Slave Link) are shown in FIG. 15, DEMUX/MUX block 1500 may provide the distribution and aggregation functions for more than two links.

In the transmitting direction (shown with a downward arrow), a sequence of MPDU payloads produced by the common upper MAC processing blocks (such as blocks 1412-1422 in FIG. 14), either in plaintext or encrypted when data confidentiality and integrity is required, enter the DEMUX/MUX block 1500 via SAP 1510 and are prioritized and queued at MPDU Buffer and Prioritization unit 1517 for transmission. For example, an MPDU payload queued for a retransmission may be assigned with a higher priority than an MPDU payload queued for an initial transmission. ML Monitoring and Selection unit 1519 determines one or more 802.11 link(s) among the multiple 802.11 links, over which a next MPDU payload in the queue is to be transmitted. MPDU Distribution unit 1518 distributes the next MPDU payload in the queue to the link(s) as determined. If the next MPDU payload in the queue is distributed to a master link, wherein the link-specific pair of TX and RX MAC addresses used on the master link are the same as the common pair of TX and RX MAC addresses used in encrypting the MPDU payload, then that next MPDU payload exits DEMUX/MUX block 1500 onto the MAC header and CRC creation block of the master link via SAP 1512. If the next MPDU payload in the queue is distributed to a slave link, wherein the link-specific pair of TX and RX MAC addresses used on the slave link are different than the common pair of TX and RX MAC addresses used in encrypting that next MPDU payload, then that next MPDU payload exits DEMUX/MUX block 1500 onto the MAC header and CRC creation block of the slave link via SAP 1522, wherein the ID Mapping unit 1523 associates that next MPDU payload with the link-specific pair of TX and RX MAC addresses used on the slave link, instead of the common pair of TX and RX MAC addresses.

In the receiving direction (shown with an upward arrow), MPDUs received over the multiple links enter DEMUX/MUX block 1500 via SAP 1514, if received over the master link, or via SAP 1524, if received over the slave link. If receiving an MPDU over the master link, DEMUX/MUX block 1500 forwards the MPDU onto the upper MAC processing blocks via SAP 1516. If receiving an MPDU over the slave link, the ID Mapping unit 1525 converts the link-specific pair of TX and RX MAC addresses in the received MAC header associated with the MPDU to the common pair of TX and RX MAC addresses before DEMUX/MUX block 1500 forwards the MPDU onto the upper MAC processing blocks via SAP 1516.

FIG. 15 illustrates a case wherein the common pair of TX and RX MAC addresses used in encrypting the MPDU payloads is reused (thus the same) as the link-specific pair of TX and RX MAC addresses used on the master link over the air. Therefore, there is no additional ID mapping unit on either the transmitting or receiving paths of the master link. In an alternative embodiment, if the link-specific pair of TX and RX MAC addresses used on the master link over the air are different from the common pair of TX and RX MAC addresses used in encrypting the MPDU payloads, respectively, then additional ID mapping units, similar to ID mapping units 1523 and 1525, may be added on the transmitting and receiving paths, respectively, of the master link as well, to perform similar MAC address conversion as in the slave link.

Figure 16:
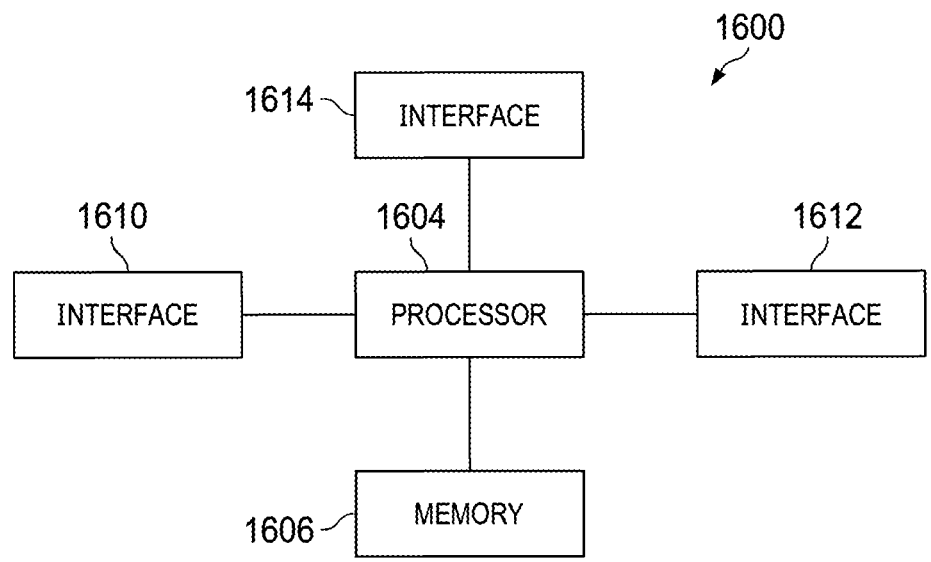
FIG. 16 is a block diagram of an embodiment processing system for performing methods described herein.

FIG. 16 illustrates a block diagram of an embodiment processing system 1600 for performing methods described herein, which may be installed in a host device. As shown, the processing system 1600 includes a processor 1604, a memory 1606, and interfaces 1610-1614, which may (or may not) be arranged as shown in FIG. 16. The processor 1604 may be any component or collection of components adapted to perform computations and/or other processing related tasks, and the memory 1606 may be any component or collection of components adapted to store programming and/or instructions for execution by the processor 1604. In an embodiment, the memory 1606 includes a non-transitory computer readable medium. The interfaces 1610, 1612, 1614 may be any component or collection of components that allow the processing system 1600 to communicate with other devices/components and/or a user. For example, one or more of the interfaces 1610, 1612, 1614 may be adapted to communicate data, control, or management messages from the processor 1604 to applications installed on the host device and/or a remote device. As another example, one or more of the interfaces 1610, 1612, 1614 may be adapted to allow a user or user device (e.g., personal computer (PC), etc.) to interact/communicate with the processing system 1600. The processing system 1600 may include additional components not depicted in FIG. 16, such as long term storage (e.g., non-volatile memory, etc.).

In some embodiments, the processing system 1600 is included in a network device that is accessing, or part otherwise of, a telecommunications network. In one example, the processing system 1600 is in a network-side device in a wireless or wireline telecommunications network, such as a base station, a relay station, a scheduler, a controller, a gateway, a router, an applications server, or any other device in the telecommunications network. In other embodiments, the processing system 1600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 17:
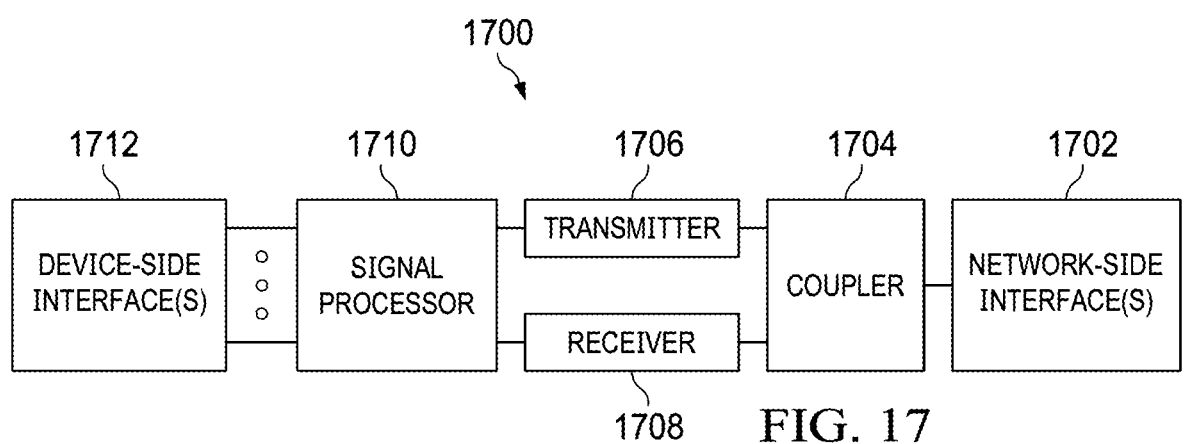
FIG. 17 is a block diagram of a transceiver adapted to transmit and receive signaling over a telecommunications network according to example embodiments described herein.

In some embodiments, one or more of the interfaces 1610, 1612, 1614 connects the processing system 1600 to a transceiver adapted to transmit and receive signaling over the telecommunications network. FIG. 17 illustrates a block diagram of a transceiver 1700 adapted to transmit and receive signaling over a telecommunications network. The transceiver 1700 may be installed in a host device. As shown, the transceiver 1700 comprises a network-side interface 1702, a coupler 1704, a transmitter 1706, a receiver 1708, a signal processor 1710, and a device-side interface 1712. The network-side interface 1702 may include any component or collection of components adapted to transmit or receive signaling over a wireless or wireline telecommunications network. The coupler 1704 may include any component or collection of components adapted to facilitate bi-directional communication over the network-side interface 1702. The transmitter 1706 may include any component or collection of components (e.g., up-converter, power amplifier, etc.) adapted to convert a baseband signal into a modulated carrier signal suitable for transmission over the network-side interface 1702. The receiver 1708 may include any component or collection of components (e.g., down-converter, low noise amplifier, etc.) adapted to convert a carrier signal received over the network-side interface 1702 into a baseband signal. The signal processor 1710 may include any component or collection of components adapted to convert a baseband signal into a data signal suitable for communication over the device-side interface(s) 1712, or vice-versa. The device-side interface(s) 1712 may include any component or collection of components adapted to communicate data-signals between the signal processor 1710 and components within the host device (e.g., the processing system 1600, local area network (LAN) ports, etc.).

The transceiver 1700 may transmit and receive signaling over any type of communications medium. In some embodiments, the transceiver 1700 transmits and receives signaling over a wireless medium. For example, the transceiver 1700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1702 comprises one or more antenna/radiating elements. For example, the network-side interface 1702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While this disclosure has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for communicating a sequence of media access control (MAC) service data units (MSDUs) that make up a traffic stream from a first station (STA) to a second STA over an Institute of Electrical and Electronics Engineers (IEEE) 802.11 network, the method comprising:
   transmitting, by the first STA to the second STA, a first MAC protocol data unit (MPDU) payload over a first 802.11 link; and
   transmitting, by the first STA to the second STA, a second MPDU payload over a second 802.11 link that is different than the first 802.11 link, a first MSDU segment in the sequence of MSDUs being encapsulated within the first MPDU payload, and a second MSDU segment in the sequence of MSDUs being encapsulated within the second MPDU payload,
   wherein a first MAC header appended to the first MPDU payload includes transmitter (TX) and receiver (RX) MAC addresses that are specific to the first 802.11 link, a first sequence control field that identifies a first location of the first MSDU segment within the sequence of MSDUs, wherein a second MAC header appended to the second MPDU payload includes TX and RX MAC addresses that are specific to the second 802.11 link and a second sequence control field that identifies a second location of the second MSDU segment within the sequence of MSDUs, wherein each of the first sequence control field and the second sequence control field further includes a corresponding fragment number indicating whether each of the first MSDU segment and the second MSDU segment is an unfragmented MSDU, wherein the first sequence control field and the second sequence control field include the same sequence number to indicate that the first MSDU segment and the second MSDU segment correspond to a common MSDU within the sequence of MSDUs, and wherein corresponding fragment numbers included in the first sequence control field and the second sequence control field have the same value indicating that the first MSDU segment and the second MSDU segment are a same MSDU fragment of the common MSDU.

2. The method of claim 1, wherein the TX and RX MAC addresses in the first MAC header include a first TX MAC address that uniquely identifies the first STA on the first 802.11 link and a first RX MAC address that uniquely identifies the second STA on the first 802.11 link, and wherein the TX and RX MAC addresses in the second MAC header include a second TX MAC address that is different than the first TX MAC address and uniquely identifies the first STA on the second 802.11 link and a second RX MAC address that is different than the first RX MAC address and uniquely identifies the second STA on the second 802.11 link.

3. The method of claim 2, wherein the first MPDU payload and the second MPDU payload are encrypted in accordance with the same security key and the same pair of TX and RX MAC addresses.

4. The method of claim 1, wherein a retry field in the second MAC header indicates that the second MPDU payload is a retransmission of the first MPDU payload such that the same MSDU fragment of the common MSDU is encapsulated within both the first MPDU payload and the second MPDU payload.

5. The method of claim 1, wherein the second MPDU payload is transmitted in response to an indication of a failure of transmission of the first MPDU payload.

6. The method of claim 1, wherein the second MPDU payload is transmitted in response to determining that duplicate transmissions are needed for MPDU payloads encapsulating MSDU segments from the sequence of MSDUs.

7. The method of claim 1, further comprising:
receiving, by the first station, a block acknowledgement (BA) message from the second STA over the first 802.11 link, the BA message including a first field indicating whether the first MSDU segment was received successfully and a second field indicating whether the second MSDU segment was received successfully.

8. The method of claim 7, wherein the first field and the second field are bits in a bitmap carried by the BA message.

9. The method of claim 1, wherein the first 802.11 link and the second 802.11 link are established over different frequency channels.

10. The method of claim 2, wherein the first MPDU payload and the second MPDU payload are encrypted in accordance with the same security key and the same pair of TX and RX MAC addresses.

11. The method of claim 1, further comprising:
receiving, by the first station, a block acknowledgement (BA) message from the second STA over the first 802.11 link, the BA message including a first field indicating whether the first MSDU segment was received successfully and a second field indicating whether the second MSDU segment was received successfully.

12. The method of claim 11, wherein the first field and the second field are bits in a bitmap carried by the BA message.

13. A first station (STA) adapted to communicate a sequence of media access control (MAC) service data units (MSDUs) that make up a traffic stream to a second STA over an Institute of Electrical and Electronics Engineers (IEEE) 802.11 network, the first STA comprising:
at least one processor; and
a computer readable storage medium storing programming for execution by the processor, and the programming including instructions that, when executed by the at least one processor, cause the first STA to perform operations including:
transmitting, to the second STA, a first MAC protocol data unit (MPDU) payload over a first 802.11 link; and
transmitting, to the second STA, a second MPDU payload over a second 802.11 link that is different than the first 802.11 link, a first MSDU segment in the sequence of MSDUs being encapsulated within the first MPDU payload and a second MSDU segment in the sequence of MSDUs being encapsulated within the second MPDU payload, wherein a first MAC header appended to the first MPDU payload includes transmitter (TX) and receiver (RX) MAC addresses that are specific to the first 802.11 link and a first sequence control field that identifies a first location of the first MSDU segment within the sequence of MSDUs, wherein a second MAC header appended to the second MPDU payload includes TX and RX MAC addresses that are specific to the second 802.11 link and a second sequence control field that identifies a second location of the second MSDU segment within the sequence of MSDUs, wherein each of the first sequence control field and the second sequence control field further includes a corresponding fragment number indicating whether each of the first MSDU segment and the second MSDU segment is an unfragmented MSDU, wherein the first sequence control field and the second sequence control field include the same sequence number to indicate that the first MSDU segment and the second MSDU segment correspond to a common MSDU within the sequence of MSDUs, and wherein corresponding fragment numbers included in the first sequence control field and the second sequence control field have the same value indicating that the first MSDU segment and the second MSDU segment are a same MSDU fragment of the common MSDU.

14. The first STA of claim 13, wherein the TX and RX MAC addresses in the first MAC header include a first TX MAC address that uniquely identifies the first STA on the first 802.11 link and a first RX MAC address that uniquely identifies the second STA on the first 802.11 link, and wherein the TX and RX MAC addresses in the second MAC header include a second TX MAC address that is different than the first TX MAC address and uniquely identifies the first STA on the second 802.11 link and a second RX MAC address that is different than the first RX MAC address and uniquely identifies the second STA on the second 802.11 link.

15. The first STA of claim 14, wherein the first MPDU payload and the second MPDU payload are encrypted in accordance with the same security key and the same pair of TX and RX MAC addresses.

16. The first STA of claim 13, wherein a retry field in the second MAC header indicates that the second MPDU payload is a retransmission of the first MPDU payload such that the same MSDU fragment of the common MSDU is encapsulated within both the first MPDU payload and the second MPDU payload.

17. The first STA of claim 13, wherein the second MPDU payload is transmitted in response to an indication of a failure of transmission of the first MPDU payload.

18. The first STA of claim 13, wherein the second MPDU payload is transmitted in response to determining that duplicate transmissions are needed for MPDU payloads encapsulating MSDU segments from the sequence of MSDUs.

19. The first STA of claim 13, the operations further comprising:
receiving a block acknowledgement (BA) message from the second STA over the first 802.11 link, the BA message including a first field indicating whether the first MSDU segment was received successfully and a second field indicating whether the second MSDU segment was received successfully.

20. The first STA of claim 19, wherein the first field and the second field are bits in a bitmap carried by the BA message.

21. The first STA of claim 13, wherein the first 802.11 link and the second 802.11 link are established over different frequency channels.

22. A method for communicating a sequence of media access control (MAC) service data units (MSDUs) that make up a traffic stream from a first station (STA) to a second STA over an Institute of Electrical and Electronics Engineers (IEEE) 802.11 network, the method comprising:
transmitting, by the first STA to the second STA, a first MAC protocol data unit (MPDU) payload over a first 802.11 link; and
transmitting, by the first STA to the second STA, a second MPDU payload over a second 802.11 link that is different than the first 802.11 link, a first MSDU segment in the sequence of MSDUs being encapsulated within the first MPDU payload, and a second MSDU segment in the sequence of MSDUs being encapsulated within the second MPDU payload,
wherein a first MAC header appended to the first MPDU payload includes transmitter (TX) and receiver (RX) MAC addresses that are specific to the first 802.11 link, a first sequence control field that identifies a first location of the first MSDU segment within the sequence of MSDUs,
wherein a second MAC header appended to the second MPDU payload includes TX and RX MAC addresses that are specific to the second 802.11 link and a second sequence control field that identifies a second location of the second MSDU segment within the sequence of MSDUs,
wherein each of the first sequence control field and the second sequence control field further includes a corresponding fragment number indicating whether each of the first MSDU segment and the second MSDU segment is an unfragmented MSDU,
wherein the first sequence control field and the second sequence control field include the same sequence number to indicate that the first MSDU segment and the second MSDU segment correspond to a common MSDU within the sequence of MSDUs, and
wherein corresponding fragment numbers included in the first sequence control field and the second sequence control field have different values indicating that the first MSDU segment and the second MSDU segment are different fragments of the common MSDU within the sequence of MSDUs, wherein a more fragments bit in the first MAC header is set to one to indicate that the common MSDU consists of a sequence of MSDU fragments, the sequence of MSDU fragments including a first fragment in the first MSDU segment and at least a second fragment in the second MSDU segment.

23. The method of claim 22, wherein the TX and RX MAC addresses in the first MAC header include a first TX MAC address that uniquely identifies the first STA on the first 802.11 link and a first RX MAC address that uniquely identifies the second STA on the first 802.11 link, and
wherein the TX and RX MAC addresses in the second MAC header include a second TX MAC address that is different than the first TX MAC address and uniquely identifies the first STA on the second 802.11 link and a second RX MAC address that is different than the first RX MAC address and uniquely identifies the second STA on the second 802.11 link.

24. The method of claim 22, wherein the first 802.11 link and the second 802.11 link are established over different frequency channels.

25. A first station (STA) adapted to communicate a sequence of media access control (MAC) service data units (MSDUs) that make up a traffic stream to a second STA over an Institute of Electrical and Electronics Engineers (IEEE) 802.11 network, the first STA comprising:
at least one processor; and
a computer readable storage medium storing programming for execution by the processor, and the programming including instructions that, when executed by the at least one processor, cause the first STA to perform operations including:
transmitting, by the first STA to the second STA, a first MAC protocol data unit (MPDU) payload over a first 802.11 link; and
transmitting, by the first STA to the second STA, a second MPDU payload over a second 802.11 link that is different than the first 802.11 link, a first MSDU segment in the sequence of MSDUs being encapsulated within the first MPDU payload, and a second MSDU segment in the sequence of MSDUs being encapsulated within the second MPDU payload,
wherein a first MAC header appended to the first MPDU payload includes transmitter (TX) and receiver (RX) MAC addresses that are specific to the first 802.11 link, a first sequence control field that identifies a first location of the first MSDU segment within the sequence of MSDUs,
wherein a second MAC header appended to the second MPDU payload includes TX and RX MAC addresses that are specific to the second 802.11 link and a second sequence control field that identifies a second location of the second MSDU segment within the sequence of MSDUs, wherein each of the first sequence control field and the second sequence control field further includes a corresponding fragment number indicating whether each of the first MSDU segment and the second MSDU segment is an unfragmented MSDU, wherein the first sequence control field and the second sequence control field include the same sequence number to indicate that the first MSDU segment and the second MSDU segment correspond to a common MSDU within the sequence of MSDUs, and wherein corresponding fragment numbers included in the first sequence control field and the second sequence control field have different values indicating that the first MSDU segment and the second MSDU segment are different fragments of the common MSDU within the sequence of MSDUs, wherein a more fragments bit in the first MAC header is set to one to indicate that the common MSDU consists of a sequence of MSDU fragments, the sequence of MSDU fragments including a first fragment in the first MSDU segment and at least a second fragment in the second MSDU segment.

26. The first STA of claim 25, wherein the TX and RX MAC addresses in the first MAC header include a first TX MAC address that uniquely identifies the first STA on the first 802.11 link and a first RX MAC address that uniquely identifies the second STA on the first 802.11 link, and wherein the TX and RX MAC addresses in the second MAC header include a second TX MAC address that is different than the first TX MAC address and uniquely identifies the first STA on the second 802.11 link and a second RX MAC address that is different than the first RX MAC address and uniquely identifies the second STA on the second 802.11 link.

27. The first STA of claim 26, wherein the first MPDU payload and the second MPDU payload are encrypted in accordance with the same security key and the same pair of TX and RX MAC addresses.

28. The first STA of claim 25, the operations further comprising:
receiving a block acknowledgement (BA) message from the second STA over the first 802.11 link, the BA message including a first field indicating whether the first MSDU segment was received successfully and a second field indicating whether the second MSDU segment was received successfully.

29. The first STA of claim 28, wherein the first field and the second field are bits in a bitmap carried by the BA message.

30. The first STA of claim 25, wherein the first 802.11 link and the second 802.11 link are established over different frequency channels.

* * * * *

UNITED STATES PATENT AND TRADEMARK OFFICE
CERTIFICATE OF CORRECTION

Page 1 of 2

PATENT NO. : 12,278,773 B2
APPLICATION NO. : 17/622659
DATED : April 15, 2025
INVENTOR(S) : Yunsong Yang It is certified that error appears in the above-identified patent and that said Letters Patent is hereby corrected as shown below:

In the Claims

In Column 24, Claims 10-12, Lines 1-15, delete "10. The method of claim 2, wherein the first MPDU payload and the second MPDU payload are encrypted in accordance with the same security key and the same pair of TX and RX MAC addresses.
11. The method of claim 1, further comprising: receiving, by the first station, a block acknowledgement (BA) message from the second STA over the first 802.11 link, the BA message including a first field indicating whether the first MSDU segment was received successfully and a second field indicating whether the second MSDU segment was received successfully.
12. The method of claim 11, wherein the first field and the second field are bits in a bitmap carried by the BA message.".

In Column 24, in Claim 13, Line 16, delete "13." and insert -- 10. --.

In Column 24, in Claim 14, Line 63, delete "14." and insert -- 11. --.

In Column 24, in Claim 14, Line 63, delete "claim 13," and insert -- claim 10, --.

In Column 25, in Claim 15, Line 8, delete "15." and insert -- 12. --.

In Column 25, in Claim 15, Line 8, delete "claim 14," and insert -- claim 11, --.

In Column 25, in Claim 16, Line 12, delete "16." and insert -- 13. --.

In Column 25, in Claim 16, Line 12, delete "claim 13," and insert -- claim 10, --.

In Column 25, in Claim 17, Line 18, delete "17." and insert -- 14. --.

In Column 25, in Claim 17, Line 18, delete "claim 13," and insert -- claim 10, --.

Signed and Sealed this
Twentieth Day of May, 2025

Coke Morgan Stewart
*Acting Director of the United States Patent and Trademark Office*

CERTIFICATE OF CORRECTION (continued)
U.S. Pat. No. 12,278,773 B2

In Column 25, in Claim 18, Line 21, delete "18." and insert -- 15. --.

In Column 25, in Claim 18, Line 21, delete "claim 13," and insert -- claim 10, --.

In Column 25, in Claim 19, Line 25, delete "19." and insert -- 16. --.

In Column 25, in Claim 19, Line 25, delete "claim 13," and insert -- claim 10, --.

In Column 25, in Claim 20, Line 33, delete "20." and insert -- 17. --.

In Column 25, in Claim 20, Line 33, delete "claim 19," and insert -- claim 16, --.

In Column 25, in Claim 21, Line 36, delete "21." and insert -- 18. --.

In Column 25, in Claim 21, Line 36, delete "claim 13," and insert -- claim 10, --.

In Column 25, in Claim 22, Line 39, delete "22." and insert -- 19. --.

In Column 26, in Claim 23, Line 20, delete "23." and insert -- 20. --.

In Column 26, in Claim 23, Line 20, delete "claim 22," and insert -- claim 19, --.

In Column 26, after "Claim 23", Line 31, under "STA on the second 802.11 link."
insert -- 21. The method of claim 20, wherein the first MPDU payload and the second MPDU payload are encrypted in accordance with the same security key and the same pair of TX and RX MAC addresses.
22. The method of claim 19, further comprising: receiving, by the first station, a block acknowledgement (BA) message from the second STA over the first 802.11 link, the BA message including a first field indicating whether the first MSDU segment was received successfully and a second field indicating whether the second MSDU segment was received successfully.
23. The method of claim 22, wherein the first field and the second field are bits in a bitmap carried by the BA message. --.

In Column 26, in Claim 24, Line 32, delete "claim 22," and insert -- claim 19, --.